(12) United States Patent
Kumagai

(10) Patent No.: US 12,722,341 B2
(45) Date of Patent: Sep. 1, 2026

(54) PRINTING APPARATUS AND PRINTING METHOD

(71) Applicant: SEIKO EPSON CORPORATION, Tokyo (JP)

(72) Inventor: Masaru Kumagai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 18/584,437

(22) Filed: Feb. 22, 2024

(65) Prior Publication Data

US 2024/0286350 A1 Aug. 29, 2024

(30) Foreign Application Priority Data

Feb. 24, 2023 (JP) ................................ 2023-027293

(51) Int. Cl.

*B29C 64/209* (2017.01)
*B25J 11/00* (2006.01)
*B29C 64/227* (2017.01)
*B29C 64/393* (2017.01)
*B33Y 30/00* (2015.01)
*B41J 3/407* (2006.01)

(52) U.S. Cl.

CPC ............ *B29C 64/209* (2017.08); *B25J 11/00* (2013.01); *B29C 64/227* (2017.08); *B29C 64/393* (2017.08); *B41J 3/4073* (2013.01); *B33Y 30/00* (2014.12)

(58) Field of Classification Search

None
See application file for complete search history.

(56) References Cited

U.S. PATENT DOCUMENTS

2021/0370592 A1 12/2021 Sugai
2022/0032651 A1* 2/2022 Hasegawa ............ B41J 2/04541

FOREIGN PATENT DOCUMENTS

JP 2021-187074 A 12/2012

* cited by examiner

*Primary Examiner* — Douglas X Rodriguez
*Assistant Examiner* — Rami A Alshoroogi
(74) *Attorney, Agent, or Firm* — WORKMAN NYDEGGER

(57) ABSTRACT

A printing apparatus includes a head that ejects liquid, a robot that includes a base portion and a distal end portion supporting the head and changes a relative position of the head with respect to the base portion, and a moving mechanism that moves a work relative to the base portion. A first printing operation in which the head ejects the liquid onto a first region in a printing region and a second printing operation in which the head ejects the liquid onto a second region in the printing region are performed. A main scan movement operation in which the moving mechanism moves the work relative to the base portion in the main scan direction is performed. The first region is adjacent to the second region in the main scan direction. The printing region includes a first overlapping region in which the first region overlaps the second region.

12 Claims, 16 Drawing Sheets

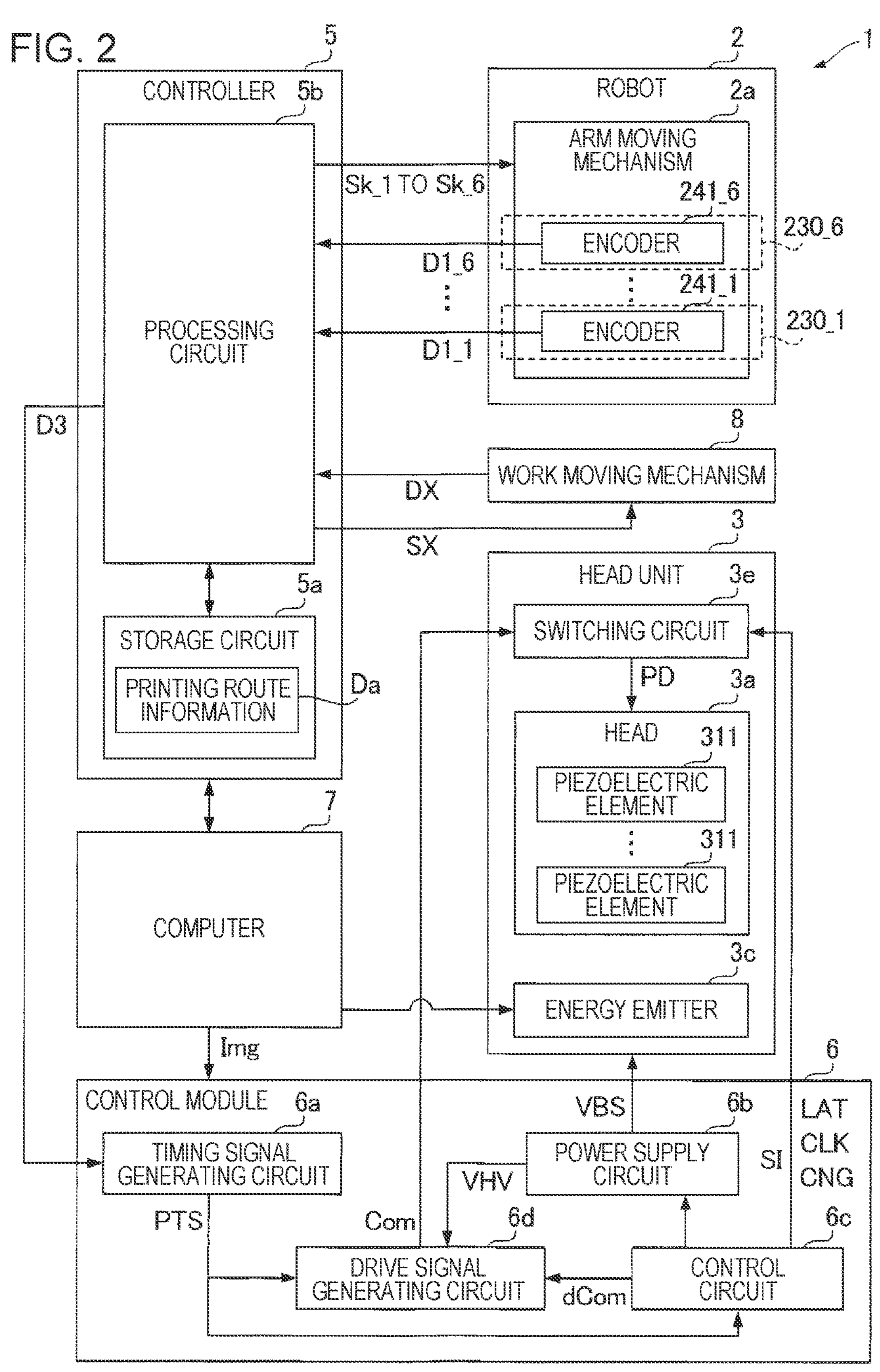
FIG. 2
5
CONTROLLER
5b
PROCESSING CIRCUIT
5a
STORAGE CIRCUIT
PRINTING ROUTE INFORMATION
Da
D3
2
ROBOT
2a
ARM MOVING MECHANISM
Sk_1 TO Sk_6
241_6
ENCODER
230_6
D1_6
241_1
ENCODER
230_1
D1_1
1
8
WORK MOVING MECHANISM
DX
SX
3
HEAD UNIT
3e
SWITCHING CIRCUIT
PD
3a
HEAD
311
PIEZOELECTRIC ELEMENT
311
PIEZOELECTRIC ELEMENT
3c
ENERGY EMITTER
7
COMPUTER
Img
6
CONTROL MODULE
6a
TIMING SIGNAL GENERATING CIRCUIT
PTS
Com
VBS
6b
POWER SUPPLY CIRCUIT
VHV
SI
LAT
CLK
CNG
6d
DRIVE SIGNAL GENERATING CIRCUIT
dCom
6c
CONTROL CIRCUIT DR_41
DR_41
Wa
RG
RT_1
RT_4
PE_1
PS_4
SR_1
SR_4
BR_1
BR_4
QR
QR
P1
P4
DR_12
DR_34
PS_2
PE_3
D1X
WG
PS_1
PE_4
DR_12
DR_34
P2
P3
QR
QR
BR_2
BR_3
SR_2
SR_3
PE_2
PS_3
RT_2
RT_3
DR_23
DR_23
D2Y
X1
X2
Y1
Y2
Z2
X
Y RG
P1
P2
P3
P4
SR_1
SR_2
SR_3
SR_4
DR_12
DR_23
DR_34
DR_41
EG12
EG14
EG21
EG41
CV1
CV2
CX
CY
WG
QR
X1
X2
Y1
Y2
Z2
V1
X
Y BRB_2
BRB_1
DRB_23 SRB_2 TR_2 DRB_42 DRB_24 TR_1 DRB_12
DRB_12 TR_1 SRB_1 DRB_41
RTB_2
RTB_1
DBY
PSB_1
PEB_1
PEB_2
PSB_2
Wa
WG
Y1
Y
X2
X1
Z2
X
Y2
PEB_4
PSB_4
PSB_3
PEB_3
DBX
RTB_3
RTB_4
DRB_23 SRB_3 TR_2 DRB_34
DRB_34 TR_2 DRB_24 DRB_42 TR_1 SRB_4 DRB_41
BRB_3
BRB_4

BRD_2
BRD_1
DRD_23
SRD_2
TRD_2
DRD_24
TRD_1
DRD_12
DRD_12
TRD_1
SRD_1
DRD_41
RTD_2
RTD_1
PSD_1
PSD_2
PED_2
PED_1
RGD
PD2
PD1
Wa
Y1
Y
X2
X1
Z2
X
Y2
WG
PD3
PD4
PSD_3
PED_4
PSD_4
PED_3
RTD_3
RTD_4
DRD_23
SRD_3
TRD_2
DRD_34
DRD_34
TRD_2
DRD_24
TRD_1
SRD_4
DRD_41
BRD_3
BRD_4

PD1
PD2
PD3
PD4
SRD_1
SRD_2
SRD_3
SRD_4
DRD_12
DRD_23
DRD_24
DRD_34
DRD_41
TRD_1
TRD_2
WG
RGD
X1
X2
Y1
Y2
Z2
X
Y

BRE_1
BRE_2
BRE_3
BRE_4
DRE_41
SRE_1
TRE_1
QRE
TRE_2
DRE_12
DRE_23
SRE_2
SRE_3
SRE_4
DRE_34
RTE_1
RTE_2
RTE_3
RTE_4
PEE_1
PEE_2
PEE_3
PEE_4
PSE_1
PSE_2
PSE_3
PSE_4
Wa
WG
X1
X2
Y1
Y2
Z2
X
Y

BRF_1
DRF_41
SRF_1
TRF_1
DRF_13
QRF
TRF_2
DRF_12
BRF_2
DRF_23
SRF_2
RTF_1
RTF_2
RTF_3
RTF_4
Wa
PEF_1
PEF_2
PEF_3
PEF_4
PSF_1
PSF_2
PSF_3
PSF_4
WG
BRF_3
BRF_4
SRF_3
SRF_4
DRF_34
X1
X2
Y1
Y2
Z2
X
Y

1H
X1
Y1
Y
Z1
Z2
Z
Y2
X
X2
2H
250
260
251
252
261
265_1
265_4
3_1
3_4
5
YR
830
820
8H
W
Wa
253
RA
12
10

PRINTING APPARATUS AND PRINTING METHOD

The present application is based on, and claims priority from JP Application Serial Number 2023-027293, filed Feb. 24, 2023, the disclosure of which is hereby incorporated by reference herein in its entirety.

BACKGROUND

1. Technical Field

The present disclosure relates to a printing apparatus and a printing method.

2. Related Art

An existing printing apparatus is known, which performs printing by ejecting liquid onto a surface of a work from a head that ejects liquid. For example, JP-A-2021-187074 discloses a printing apparatus having a robot that changes the position of a head.

However, in the above-described existing printing apparatus, the quality of an image may decrease when the image is printed in a relatively wide range such as a range wider than a range in which the head can be moved by the robot.

SUMMARY

To solve the above-described problem, according to an aspect of the present disclosure, a printing apparatus includes a head that ejects liquid, a robot that includes a base portion and a distal end portion supporting the head and changes a relative position of the head with respect to the base portion, a moving mechanism that moves a work relative to the base portion, and a controller that performs a plurality of printing operations in which the robot moves the head in a main scan direction and the head ejects the liquid onto a printing region on the work. The plurality of printing operations include a first printing operation in which the head ejects the liquid onto a first region in the printing region, and a second printing operation in which the head ejects the liquid onto a second region in the printing region. The controller performs a main scan movement operation in which the moving mechanism moves the work relative to the base portion in the main scan direction in a time period between the first printing operation and the second printing operation. The first region is adjacent to the second region in the main scan direction. The printing region includes a first overlapping region in which the first region overlaps the second region.

According to another aspect of the present disclosure, a printing method of a printing apparatus including a head that ejects liquid, a robot that includes a base portion and a distal end portion supporting the head and changes a relative position of the head with respect to the base portion, and a moving mechanism that moves a work relative to the base portion includes, a plurality of printing operations in which the robot moves the head in a main scan direction and the head ejects the liquid onto a printing region on the work, the plurality of printing operation including a first printing operation in which the head ejects the liquid onto a first region in the printing region and a second printing operation in which the head ejects the liquid onto a second region in the printing region, and a main scan movement operation in which the moving mechanism moves the work relative to the base portion in the main scan direction in a time period between the first printing operation and the second printing operation. The first region is adjacent to the second region in the main scan direction. The printing region includes a first overlapping region in which the first region overlaps the second region on the work.

BRIEF DESCRIPTION OF THE DRAWINGS

FIG. 2 is a block diagram illustrating an electrical configuration of the printing apparatus according to the first embodiment.

DESCRIPTION OF EMBODIMENTS

1. First Embodiment

Figure 1:
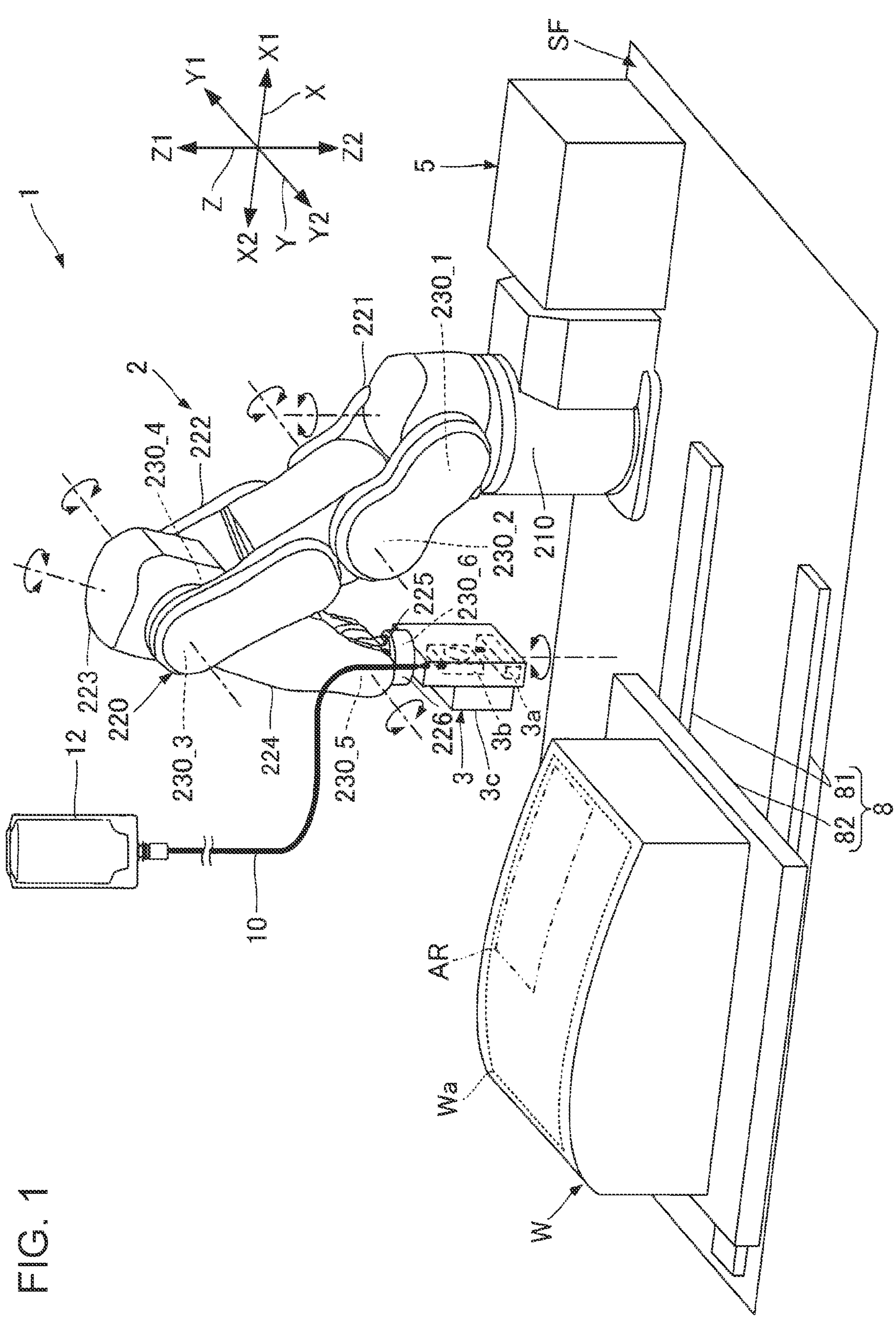
FIG. 1 is a perspective view illustrating a schematic structure of a printing apparatus according to a first embodiment.

Embodiments of the present disclosure are described with reference to the accompanying drawings. In the drawings, dimensions and scales of components are different from those of the actual components, and some components are schematically illustrated to facilitate understanding. In addition, the scope of the present disclosure is not limited to the embodiments unless otherwise stated to limit the present disclosure in the following description.

In the following description, an X axis, a Y axis, and a Z axis that intersect each other are used as appropriate. In addition, one of directions along the X axis is hereinafter referred to as an X1 direction, and the other of the directions along the X axis is hereinafter referred to as an X2 direction. Similarly, directions that extend along the Y axis and are opposite to each other are hereinafter referred to as a Y1 direction and a Y2 direction. In addition, directions that extend along the Z axis and are opposite to each other are hereinafter referred to as a Z1 direction and a Z2 direction.

The X, Y, and Z axes correspond to coordinate axes of a world coordinate system set in a space in which a robot 2 described later is disposed. Typically, the Z axis is a vertical axis, the Z2 direction is a downward direction in a vertical direction. A base coordinate system having, as the origin, the position of a base portion 210 (described later) of the robot 2 is associated with the world coordinate system by calibration. A case where an operation of the robot 2 is controlled using the world coordinate system as a robot coordinate system will be exemplified below for convenience.

The Z axis may not be the vertical axis. The X, Y, and Z axes are typically perpendicular to each other, but are not limited thereto and may not be perpendicular to each other. For example, the X, Y, and Z axes may intersect each other at an angle in a range from 80° to 100°.

1-1. Schematic Structure of Printing Apparatus

FIG. 1 is a perspective view illustrating a schematic structure of a printing apparatus 1 according to a first embodiment. The printing apparatus 1 performs printing on a printing region Wa by using an ink jet method. The printing region Wa is a portion of a surface of a work W or is the entire surface of the work W.

The work W has the surface including the printing region Wa that is a range in which an image is formed. The work W illustrated in FIG. 1 has a three-dimensional shape, but may be in a two-dimensional shape. Therefore, the printing region Wa is a curved surface in the example illustrated in FIG. 1, but may be a flat surface. The work W is an object as a certain product. Performing printing on the printing region Wa is one of a series of steps of manufacturing the product.

As illustrated in FIG. 1, the printing apparatus 1 includes the robot 2, a head unit 3, a controller 5, a work moving mechanism 8, a tube portion 10. These components will be briefly described in order.

The robot 2 is a moving mechanism that changes the position and orientation of the head unit 3 in the world coordinate system. In the example illustrated in FIG. 1, the robot 2 is a so-called 6-axis vertically articulated robot.

As illustrated in FIG. 1, the robot 2 includes the base portion 210 and an arm portion 220.

The base portion 210 is a stage supporting the arm portion 220. In the example illustrated in FIG. 1, the base portion 210 is fixed to a floor surface facing toward the Z1 direction or to a mounting surface SF such as a base stage via a screw or the like.

The arm portion 220 is a 6-axis robot arm having a base end attached to the base portion 210, and a distal end whose position and orientation three-dimensionally change with respect to the base end. Specifically, the arm portion 220 has arms 221, 222, 223, 224, 225, and 226 coupled to each other in this order. The arms 221 to 226 are also referred to as links. The arm 226 is an example of a distal end portion.

Each of joints 230_1 to 230_6 is a mechanism that couples one of two adjacent members among the base portion 210 and the arms 221 to 226 to the other of the two members in such a way that one of the two adjacent members can rotate around an axis indicated by any one of dashed-and-dotted lines in FIG. 1 with respect to the other of the two adjacent members. Each of the joints 230_1 to 230_6 may be hereinafter referred to as a "joint 230".

Although not illustrated in FIG. 1, each of the joints 230_1 to 230_6 has a drive mechanism that rotates one of two adjacent members corresponding to the joint with respect to the other of the two adjacent members. Each of the drive mechanisms includes, for example, a motor that generates drive force for the rotation, a decelerator that reduces the drive force and outputs the reduced drive force, and an encoder such as a rotary encoder that detects an operational amount such as an angle of the rotation. A set of the drive mechanisms of the joints 230_1 to 230_6 corresponds to an arm drive mechanism 2*a* illustrated in FIG. 2 described later.

The arm 226 is located at the most distal end of the arm portion 220 among the arms 221 to 226 of the robot 2. The head unit 3 as an end effector is attached to the arm 226 in a state of being fixed to the arm 226 via a screw or the like.

The head unit 3 is an assembly having a head 3*a* that ejects ink toward the work W. The ink is an example of "liquid". The surface of the work W is made of, for example, a material non-absorbent to the ink. Examples of the material are plastic and inorganic compounds such as metal and glass.

In the present embodiment, the head unit 3 includes a pressure control valve 3*b* and an energy emitter 3*c*, in addition to the head 3*a*. The head unit 3 is described later with reference to FIG. 3.

The ink is not particularly limited. In the present embodiment, as the ink, ultraviolet curable ink is used. The ink is not limited to ink containing a color material and may be ink containing, as a dispersoid, conductive particles such as metal particles for formation of a wiring or the like, a clear ink, or a treatment liquid for surface treatment of the work W, for example.

The head unit 3 is coupled to the tube portion 10 and a wiring portion not illustrated. The tube portion 10 is a tube or a tube group for supplying the ink from an ink tank 12 to the head unit 3. The wiring portion is a wiring or a wiring group for supplying an electrical signal for driving the head 3*a*. The routing of the wiring portion may be the same as or different from the routing of the tube portion 10.

The work moving mechanism 8 is a mechanism that moves the work W along the X axis while supporting the work W. The work moving mechanism 8 includes a pair of rail members 81 and a carriage 82. The pair of rail members 81 is flat members on which the carriage 82 moves along the X axis. The carriage 82 is a flat member that supports the work 8. The work W is mounted on a surface of the carriage 82 facing toward the Z1 direction. The carriage 82 is slidably engaged with the rail members 81. In the example illustrated in FIG. 1, the work moving mechanism 8 is fixed to the mounting surface SF.

It can be said that the work moving mechanism 8 moves the base portion 210 relative to the work W by moving the work W. The work moving mechanism 8 is an example of a "moving mechanism". The printing apparatus 1 may include a moving mechanism that moves the base portion 210 relative to the work W by moving the base portion 210 by using an automatic guided vehicle (AGV) instead of the work mechanism 8. A configuration using the AGV is useful when the work W is relatively large and it is difficult to move the work W. In the present embodiment, the work moving mechanism 8 includes the rail members 81 and the carriage 82, but may include, instead of the rail members 81 and the carriage 82, a robot that supports and moves the work W and is separated from the robot 2 supporting the head unit 3.

1-2. Electrical Configuration of Printing Apparatus

FIG. 2 is a block diagram illustrating an electrical configuration of the printing apparatus 1 according to the first embodiment. FIG. 2 illustrates electrical components among components of the printing apparatus 1. As illustrated in FIG. 2, in addition to the components illustrated in FIG. 1 described above, the printing apparatus 1 includes a control module 6 that is communicably connected to the controller 5, and a computer 7 that is communicably connected to the controller 5 and the control module 6. The controller 5, the control module 6, and the computer 7 may be, for example, collectively referred to as a "controller".

The electrical components illustrated in FIG. 2 may be divided as appropriate, one or more of the electrical components may be included in another component among the electrical components or may be integrally formed with another component among the electrical components.

The computer 7 is, for example, a computer having a program installed therein. The computer 7 includes, for example, either one or both of semiconductor memories that are a volatile memory such as a random-access memory (RAM) and a nonvolatile memory such as a read-only memory (ROM), an electrically erasable programmable read-only memory (EEPROM) or a programmable ROM (PROM). The computer 7 includes a processor such as one or more central processing units (CPUs).

The controller 5 includes a function of controlling driving of the robot 2, a function of driving the work moving mechanism 8, and a function of generating a signal D3 for synchronizing an operation of ejecting the ink from the head unit 3 with an operation of the robot 2.

In addition, the controller 5 includes a storage circuit 5*a* and a processing circuit 5*b*.

The storage circuit 5*a* includes, for example, either one or both of semiconductors that are a volatile memory and a nonvolatile memory. A part of the storage circuit 5*a* or the entire storage circuit 5*a* may be included in the processing circuit 5*b*.

The processing circuit 5*b* includes, for example, a processor such as one or more central processing units (CPUs). The processing circuit 5*b* may include a programmable logic device such as a field-programmable gate array (FPGA) instead of or in addition to the one or more CPUs.

The storage circuit 5*a* stores various programs to be executed by the processing circuit 5*b* and various data to be processed by the processing circuit 5*b*.

In the storage circuit 5*a*, printing route information Da is recorded. The printing route information Da is used for the control of the operation of the robot 2 and indicates the position and orientation of the head 3*a* in a route along which the head 3*a* is to be moved during the execution of a printing operation. The printing route information Da includes information indicating a change in a relative position of the head 3*a* with respect to the work W during the execution of the printing operation and information indicating a change in relative orientation of the head 3*a* to the work W during the execution of the printing operation.

The processing circuit 5*b* controls an operation of the arm drive mechanism 2*a* of the robot 2 based on the printing route information Da and generates the signal D3.

The arm drive mechanism 2*a* is a set of the drive mechanisms of the joints 230_1 to 230_6 and includes motors for driving the respective joints 230 of the robot 2, and encoders 241_1 to 241_6 that detect rotational angles of the respective joints 230 of the robot 2.

The processing circuit 5*b* performs inverse kinematics calculation for converting the printing route information Da into operational amounts that are rotational angles, rotational speeds, and the like of the joints 230 of the robot 2. Then, the processing circuit 5*b* outputs control signals Sk_1 to Sk_6 in such a way that the operational amounts that are the actual rotational angles, rotational speeds, and the like of the joints 230 are the results of the above-described calculation based on the printing route information Da. Output signals D1_1 to D1_6 may be hereinafter collectively referred to as output signals D1.

In addition, the processing circuit 5*b* generates the signal D3 based on an output signal D1 from at least one of the encoders 241_1 to 241_6 included in the arm drive mechanism 2*a*. For example, the processing circuit 5*b* generates, as the signal D3, a trigger signal including a pulse corresponding to a timing when the output signal D1 from the one of the plurality of encoders becomes equal to a predetermined value.

In addition, the processing circuit 5*b* outputs a control signal SX based on an output signal DX from the work moving mechanism 8. The work moving mechanism 8 moves along the X axis based on the control signal SX.

The control module 6 is a circuit that controls, based on the signal D3 output from the controller 5 and print data Img from the computer 7, an operation of ejecting the ink from the head unit 3. The print data Img is information indicating an image to be printed on the work W in each of a plurality of routes indicated by the printing route information Da. The control module 6 includes a timing signal generating circuit 6*a*, a power supply circuit 6*b*, a control circuit 6*c*, and a drive signal generating circuit 6*d*.

The timing signal generating circuit 6*a* generates a timing signal PTS based on the signal D3. The timing signal generating circuit 6*a* includes, for example, a timer for starting generating the timing signal PTS when the timing signal generating circuit 6*a* detects the signal D3.

The power supply circuit 6*b* generates an offset potential VBS and supplies the offset potential VBS to the head unit 3. The power supply circuit 6*b* generates a power supply potential VHV and supplies the power supply potential VHV to the drive signal generating circuit 6*d*.

The control circuit 6*c* generates a control signal SI, a waveform specifying signal dCom, a latch signal LAT, a clock signal CLK, and a change signal CNG based on the timing signal PTS. The control signal SI, the waveform specifying signal dCom, the latch signal LAT, the clock signal CLK, and the change signal CNG are synchronized with the timing signal PTS. Among these signals, the waveform specifying signal dCom is input to the drive signal generating circuit 6*d*. The control signal SI, the latch signal LAT, the clock signal CLK, and the change signal CNG are input to a switching circuit 3*e* of the head unit 3.

The control circuit 6*c* includes, for example, a processor such as one or more CPUs. The control circuit 6*c* may include a programmable logic device such as an FPGA instead of or in addition to the one or more CPUs.

The control signal SI is a digital signal for specifying operational states of piezoelectric elements 311 included in the head 3*a* of the head unit 3. The control signal SI specifies whether the ink is to be ejected from nozzles N corresponding to the piezoelectric elements 311, and specifies amounts of the ink to be ejected from the nozzles N. The waveform specifying signal dCom is a digital signal for defining a waveform of a drive signal Com. The latch signal LAT and the change signal CNG are used with the control signal SI and define a timing of ejecting the ink from the nozzles N by defining a timing of driving the piezoelectric elements 311. The clock signal CLK is synchronized with the timing signal PTS and serves as a reference.

The drive signal generating circuit 6*d* generates the drive signal Com for driving each of drive elements included in the head 3*a* of the head unit 3. A signal with a waveform that is included in the waveform included in the drive signal Com and is to be actually supplied to the piezoelectric elements 311 is a drive pulse PD.

The switching circuit 3*e* includes a switching element that switches whether to supply, as the drive pulse PD, at least a part of the waveform included in the drive signal Com based on the control signal SI.

The computer 7 includes a function of generating the printing route information Da, a function of supplying information such as the printing route information Da to the controller 5, and a function of supplying information such as the print data Img to the control module 6. The computer 7 also functions as a user interface controller of the printing apparatus 1. A user operates the printing apparatus 1 in such a way that the printing apparatus 1 causes the robot 2 and the head unit 3 to perform a plurality of printing operations including a first printing operation, a second printing operation, a third printing operation, and a fourth printing operation via the controller 5 and the control module 6. The first to fourth printing operations are described later. The computer 7 further includes a function of controlling driving of the energy emitter 3*c*.

1-3. Configuration of Head Unit

Figure 3:
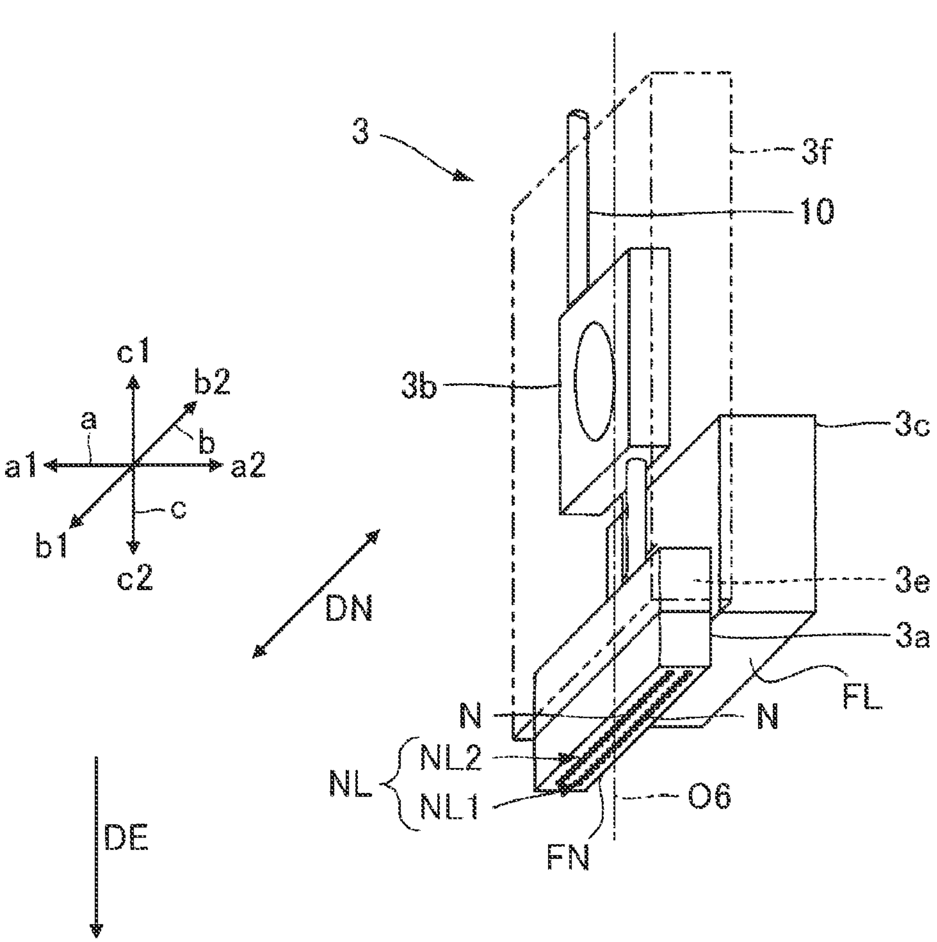
FIG. 3 is a perspective view illustrating a schematic configuration of a head unit.

FIG. 3 is a perspective view illustrating a schematic configuration of the head unit 3. In the following description, an a axis, a b axis, and a c axis that intersect each other are used for convenience. In addition, one of directions along the a axis is hereinafter referred to as an a1 direction, and the other of the directions along the a axis is hereinafter referred to as an a2 direction. Similarly, directions that extend along the b axis and are opposite to each other are hereinafter referred to as a b1 direction and a b2 direction. In addition, directions that extend along the c axis and are opposite to each other are hereinafter referred to as a c1 direction and a c2 direction.

The a, b, and c axes correspond to coordinate axes of a tool coordinate system set for the head unit 3. A relationship between a relative position and a relative orientation with respect to the above-described world coordinate system or the robot coordinate system is changed by an operation of the robot 2 described above. In the example illustrated in FIG. 3, the c axis is parallel to a rotational axis O6. The a, b, and c axes are typically perpendicular to each other, but are not limited thereto. For example, the a, b, and c axes may intersect each other at an angle in a range from 80° to 100°. The tool coordinate system is associated with the base coordinate system or the robot coordinate system by calibration.

The head unit 3 includes the head 3*a*, the pressure control valve 3*b*, and the energy emitter 3*c*, as described above. The head 3*a*, the pressure control valve 3*b*, and the energy emitter 3*c* are supported by a support body 3*f* indicated by a dashed-and-double-dotted line in FIG. 3. The pressure control valve 3*b* may not be attached to the arm 226 and may be attached to another one of the arms, for example. Alternatively, the pressure control valve 3*b* may be located at a position fixed with respect to the base portion 210, for example.

The support body 3*f* is, for example, made of a metal material or the like and is a substantially rigid body. In FIG. 3, the support body 3*f* has a flat box shape. However, the shape of the support body 3*f* is not limited thereto and the support body 3*f* may have any shape.

The support body 3*f* is attached to the arm 226. Therefore, the head 3*a*, the pressure control valve 3*b*, and the energy emitter 3*c* are collectively supported by the arm 226 via the support body 3*f*. Therefore, relative positions of the head 3*a*, the pressure control valve 3*b*, and the energy emitter 3*c* with respect to the arm 226 are fixed. In the example illustrated in FIG. 3, the pressure control valve 3*b* is disposed at a position in the c1 direction with respect to the head 3*a*. The energy emitter 3*c* is disposed at a position in the a2 direction with respect to the head 3*a*.

The head 3*a* includes a nozzle surface FN and the plurality of nozzles N opened on the nozzle surface FN. The plurality of nozzles N are sectioned into a first nozzle array NL1 and a second nozzle array NL2 that are spaced apart from each other in the direction along the a axis. Each of the first nozzle array NL1 and the second nozzle array NL2 is a set of a plurality of nozzles N linearly arrayed in a nozzle array direction DN that is the direction along the b axis.

Although not illustrated, the head 3*a* includes, for each of the nozzles N, a piezoelectric element 311 and a cavity for storing the ink. Each of the piezoelectric elements 311 changes pressure in the cavity corresponding to the piezoelectric element 311 to cause the ink to be ejected in an ejection direction DE from the nozzle N corresponding to the cavity in such a way that a droplet of the ejected ink lands on the surface of the work W. As the drive elements for ejecting the ink from the nozzles N, heaters that heat the ink in the cavities may be used instead of the piezoelectric elements.

The ink is supplied from the ink tank 12 to the head 3*a* through the tube portion 10. The tube portion 10 is coupled to the head 3*a* via the pressure control valve 3*b*. The pressure control valve 3*b* is a valve mechanism that is opened and closed based on pressure of the ink in the head 3*a*. Even when a positional relationship between the head 3*a* and the ink tank 12 changes, the pressure of the ink in the head 3*a* is maintained at a negative level in a predetermined range due to the opening and closing of the valve mechanism.

The energy emitter 3*c* emits energy such as light, heat, an electron beam, or radiation for hardening or solidifying the ink on the work W. In the present embodiment, since the ultraviolet curable ink is used, the energy emitter 3*c* includes a light emitting diode (LED) that emits ultraviolet light.

As illustrated in FIG. 3, the head unit 3 includes the head 3*a*. The robot 2 includes the arm 226 and the base portion 210. The arm 226 is the distal end portion supporting the head unit 3. It can be said that the robot 2 changes a relative position of the head 3*a* with respect to the base portion 210. Changing the relative position of the head 3*a* with respect to the base portion 210 includes changing the position of the head 3*a* while the base portion 210 is fixed, and changing the position of the base portion 210 while the head 3*a* is fixed. In addition, the robot 2 may be able to change the position of the head 3*a* while being able to change the position of the base portion 210. In the present embodiment, the robot 2 changes the position of the head 3*a* while the base portion 210 is fixed. In the present embodiment, the robot 2 changes a relative position of the head 3*a* with respect to the base portion 210 and changes a relative orientation of the head 3*a* with respect to the base portion 210.

1-4. Printing Operation According to Present Embodiment

In the present embodiment, the printing region Wa is wider than a range in which the head 3*a* can be moved by the robot 2. FIG. 1 illustrates the range AR in which the head 3*a* can be moved. As is understood from FIG. 1, the arm 226 that is the distal end portion of the arm portion 220 of the robot 2 does not reach a portion included in the printing region Wa and not included in the range AR, for example, an end portion of the printing region Wa in the X2 direction, and an image or the like cannot be printed on the portion, for example, on the end portion when the work is not moved. To avoid this, in the present embodiment, the printing apparatus 1 can eject the ink onto the entire printing region Wa by moving the work W in a time period between a plurality of printing operations. Specifically, the printing apparatus 1 divides the printing region Wa into a plurality of band regions BR and forms a partial image in each of the band regions BR to form an image in the printing region Wa. The range AR in which the head 3*a* can be moved is limited due to not only a design factor of the robot 2 itself but also a factor relating to the shape of the work W, the purpose of suppressing an excessive deformation of the tube portion 10, and the like.

In the following description, it is assumed that the printing region Wa is a flat surface parallel to an XY plane for simplification of description. In the present embodiment, each of the plurality of band regions BR has a rectangular shape elongated in the X axis. However, when the printing region Wa is a curved surface or the like, each of the plurality of band regions BR may have a shape other than a rectangular shape. The shape other than a rectangular shape may be a substantially elliptical shape, a rhombic shape, a trapezoidal shape, or the like, for example.

The printing apparatus 1 performs a printing operation on each of the plurality of band regions BR. The printing operation is an operation of ejecting the ink from the head 3*a* onto the band regions BR while causing the robot 2 to move the head 3*a* in a main scan direction. It is preferable that the main scan direction be set to a longitudinal direction of the band regions BR. In the present embodiment, since each of the band regions BR has a rectangular shape elongated in the X axis, the main scan direction is the direction along the X axis. In the present embodiment, the main scan direction is not changed in the band regions BR. However, when each of the band regions BR does not have a rectangular shape, the main scan direction may be changed in the band regions BR. A direction that intersects the main scan direction is referred to as an auxiliary scan direction. In the present embodiment, the auxiliary scan direction extends along the Y axis. In the present embodiment, during the execution of a printing operation, the robot 2 maintains the orientation of the head 3*a* in such a way that the nozzle array direction DN is orthogonal to the main scan direction. That is, during the execution of the printing operation, the nozzle array direction DN is parallel to the auxiliary scan direction.

In the present embodiment, for example, the printing apparatus 1 performs a main scan movement operation in a time period between the first printing operation of ejecting the ink onto a first band region BR_1 and the second printing operation of ejecting the ink onto a second band region BR_2. Therefore, the first printing operation and the second printing operation are not continuously performed. The first band region BR_1 and the second band region BR_2 are included in the printing region Wa. The main scan movement operation is to cause the work moving mechanism 8 to move the work W relative to the base portion 210 in the direction along the X axis that is the main scan direction.

As an aspect of the arrangement of the first band region BR_1 and the second band region BR_2, the first band region BR_1 and the second band region BR_2 are arranged in such a way that the first band region BR_1 is adjacent to the second band region BR_2 in the direction along the X axis and does not overlap the second band region BR_2. The direction along the X axis is the main scan direction. However, in this aspect, when at least one of the first band region BR_1 and the second band region BR_2 shifts, a white streak or a black streak occurs and the quality of an image formed on the printing region Wa decreases. The white streak is a very small gap where the ink does not adhere to the printing region Wa. The black streak is a dark streak caused by the ink adhering to the printing region Wa in duplicate due to unintentional overlapping of the adjacent band regions BR. Specifically, when the first band region BR_1 shifts away from the second band region BR_2, a region where the ink does not adhere, that is, a white streak occurs between the first band region BR_1 and the second band region BR_2. When the first band region BR_1 shifts closer to the second band region BR_2, a part of the first band region BR_1 and a part of the second band region BR_2 overlap, and a black streak occurs. The white streak and the black streak extend along the direction orthogonal to the main scan direction, that is, the direction along the Y axis.

In the first embodiment, an overlapping region DR in which the first band region BR_1 overlaps the second band region BR_2 is provided in the printing region Wa. Since the overlapping region DR is provided, even when at least one of the first band region BR_1 and the second band region BR_2 shifts, it is possible to suppress the occurrence of a white streak and a black streak and thus suppress a reduction in the quality of an image. The reason why the occurrence of a white streak and a black streak can be suppressed is described later.

Figure 4:
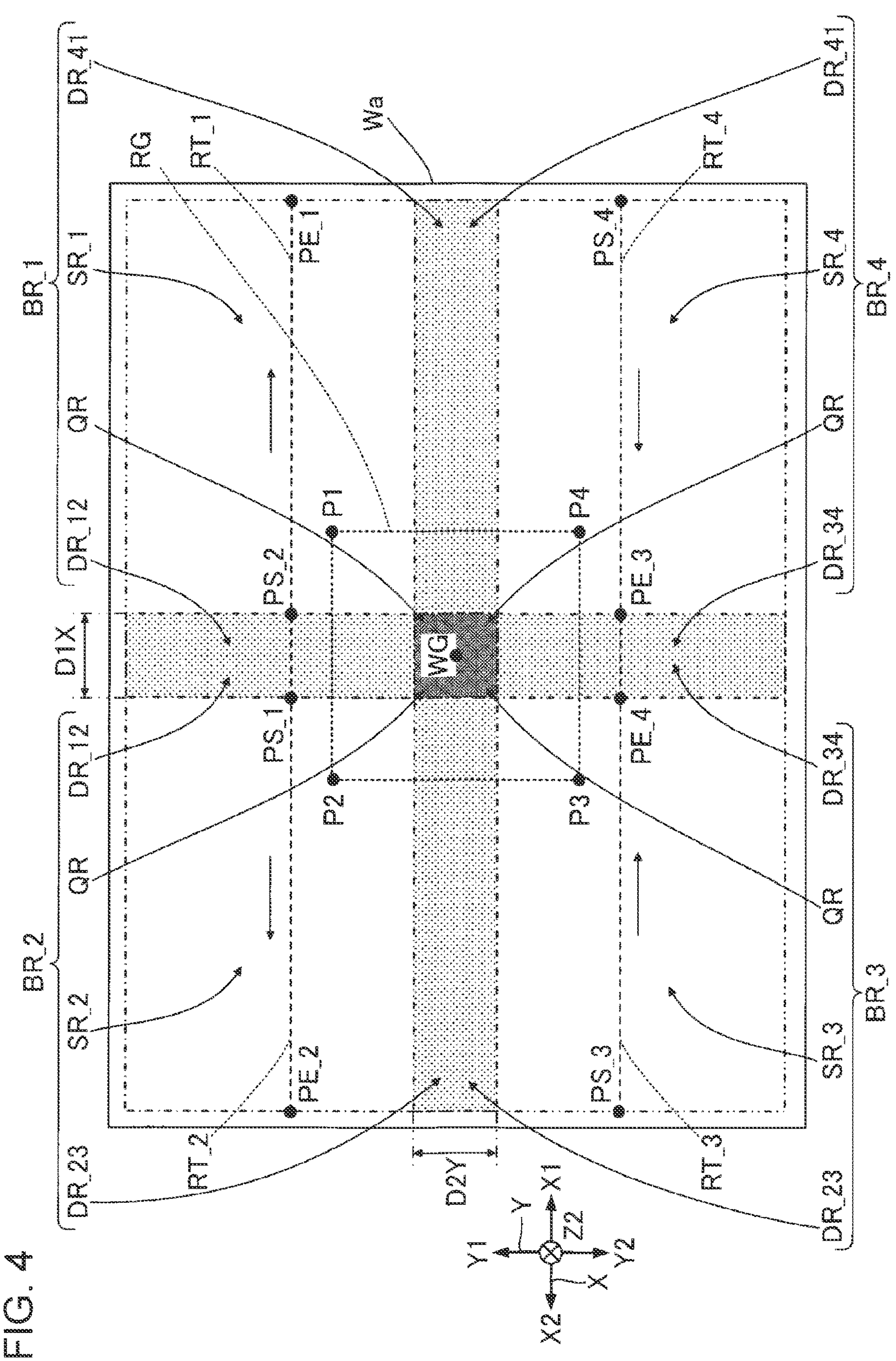
FIG. 4 is a diagram illustrating band regions according to the first embodiment.

FIG. 4 is a diagram illustrating the band regions BR according to the first embodiment. The printing apparatus 1 performs, for example, the third printing operation of ejecting the ink onto a third band region BR_3 and the fourth printing operation of ejecting the ink onto a fourth band region BR_4, in addition to the first printing operation and the second printing operation. The printing region Wa includes the first band region BR_1, the second band region BR_2, the third band region BR_3, and the fourth band region BR_4. In the following description, the first band region BR_1, the second band region BR_2, the third band region BR_3, and the fourth band region BR_4 may be collectively referred to as band regions BR without being distinguished. In the first embodiment, although the printing region Wa includes the four band regions BR, the number of band regions BR included in the printing region Wa is not limited to four. For example, the number of band regions BR included in the printing region Wa may be two or three or may be five or more.

The first band region BR_1 is an example of a "first region". The second band region BR_2 is an example of a "second region". The third band region BR_3 is an example of a "third region". The fourth band region BR_4 is an example of a "fourth region".

In FIG. 4, the band regions BR are reduced to some extent in order not to overlap contours of the band regions BR with the contour of the printing region Wa. In addition, in FIG. 4, to easily understand ranges of overlapping regions DR and a range of an overlapping region QR, the overlapping regions DR and the overlapping region QR are hatched. Since the number of overlapping band regions BR in each of the overlapping regions DR is different from the number of overlapping band regions BR in the overlapping region QR, the type of the hatching of the overlapping regions DR is different from the type of the hatching of the overlapping region QR.

The first band region BR_1 is located in an end portion of the printing region Wa in the X1 direction and in an end portion of the printing region Wa in the Y1 direction. The second band region BR_2 is located in an end portion of the printing region Wa in the X2 direction and in the end portion of the printing region Wa in the Y1 direction. The third band region BR_3 is located in the end portion of the printing region Wa in the X2 direction and in an end portion of the printing region Wa in the Y2 direction. The fourth band region BR_4 is located in the end portion of the printing region Wa in the X1 direction and in the end portion of the printing region Wa in the Y2 direction.

As illustrated in FIG. 4, each of the band regions BR includes an overlapping region DR in which the band region BR overlaps another one of the band regions BR, and the overlapping region QR in which the band region BR overlaps the other three band regions BR. In the first embodiment, although an overlapping region TR is not present, each of the band regions BR may include an overlapping region TR in which the band region BR overlaps other two of the band regions BR. In other words, each of the overlapping regions DR is a region in which two of the band regions BR overlap each other. Each of the overlapping regions TR is a region in which three of the band regions BR overlap. The overlapping region QR is a region in which all of the four band regions BR overlap. In addition, a region that is included in each of the band regions BR and in which the band region BR does not overlap the other band regions BR may be referred to as a non-overlapping region SR.

Specifically, the first band region BR_1 includes a non-overlapping region SR_1, an overlapping region DR_12, an overlapping region DR_41, and the overlapping region QR. In the following description, an overlapping region DR_xy is a region in which an x-th band region BR_x overlaps a y-th band region BR_y, x is any integer from 1 to 4, and y is different from x and is any integer from 1 to 4. For example, the overlapping region DR_12 is a region in which the first band region BR_1 overlaps the second band region BR_2.

The overlapping region QR is a region in which all of the first band region BR_1, the second band region BR_2, the third band region BR_3, and the fourth band region BR_4 overlap. As is understood from FIG. 4, the overlapping region QR includes the center WG of gravity of the printing region Wa and is a central region of the printing region Wa. The center of gravity is a point at which the sum of cross-sectional first moments of area in the shape of a target is zero. For example, when the shape of the target is a circle, the center of gravity is the center of the circle. When the shape of the target is a parallelogram, the center of gravity is an intersection of two diagonals of the parallelogram.

The second band region BR_2 includes a non-overlapping region SR_2, the overlapping region DR_12, an overlapping region DR_23, and the overlapping region QR. The third band region BR_3 includes a non-overlapping region SR_3, the overlapping region DR_23, an overlapping region DR_34, and the overlapping region QR. The fourth band region BR_4 includes a non-overlapping region SR_4, the overlapping region DR_41, the overlapping region DR_34, and the overlapping region QR.

The overlapping region DR_12 is an example of a "first overlapping region". The overlapping region DR_23 is an example of a "second overlapping region". The overlapping region DR_34 is an example of a "fourth overlapping region". The overlapping region DR_41 is an example of a "fifth overlapping region". The overlapping region QR is an example of a "third overlapping region".

As illustrated in FIG. 4, the first band region BR_1 is adjacent to the second band region BR_2 in the direction along the X axis that is the main scan direction. Similarly, the third band region BR_3 is adjacent to the fourth band region BR_4 in the direction along the X axis that is the main scan direction. The second band region BR_2 is adjacent to the third band region BR_3 in the direction along the Y axis that is the auxiliary scan direction. The first band region BR_1 is adjacent to the fourth band region BR_4 in the direction along the Y axis.

As illustrated in FIG. 4, the head 3*a* ejects the ink while moving along a route RT_1 to form a partial image based on the print data Img in the first band region BR_1. Specifically, the movement of the head 3*a* along any route indicates that the robot 2 operates in such a way that a tool center point set near the head 3*a* moves along the route. The tool center point is a virtual reference point representing the head 3*a* and is set to, for example, a position shifted by approximately several millimeters in the ejection direction DE from the center of or the center of gravity of the nozzle arrays NL disposed in the nozzle surface FN. Similarly, the head 3*a* ejects the ink while moving along a route RT_2 to form a partial image based on the print data Img in the second band region BR_2. The head 3*a* ejects the ink while moving along a route RT_3 to form a partial image based on the print data Img in the third band region BR_3. The head 3*a* ejects the ink while moving along a route RT_4 to form a partial image based on the print data Img in the fourth band region BR_4.

The route RT_1 extends from a start position PS_1 to an end position PE_1. The route RT_2 extends from a start position PS_2 to an end position PE_2. The route RT_3 extends from a start position PS_3 to an end position PE_3. The route RT_4 extends from a start position PS_4 to an end position PE_4. A part of the route RT_1 overlaps a part of the route RT_2. A part of the route RT_3 overlaps a part of the route RT_4. The route RT_1 and the route RT_2 do not overlap the third route RT_3 and the fourth route RT_4.

In the following description, the route RT_1, the route RT_2, the route RT_3, and the route RT_4 may be hereinafter collectively referred to as routes RT without being distinguished. The start position PS_1, the start position PS_2, the start position PS_3, and the start position PS_4 may be hereinafter collectively referred to as start positions PS without being distinguished. The end position PE_1, the end position PE_2, the end position PE_3, and the end position PE_4 may be hereinafter collectively referred to as end positions PE without being distinguished. As illustrated in FIG. 4, the routes RT are line segments parallel to the X axis. However, the routes RT may not be line segments parallel to the X axis and may be broken lines or curved lines, for example. In FIG. 4, among the routes RT, the route RT_1 and the route RT_3 extend from the X2 direction toward the X1 direction, and the route RT_2 and the route RT_4 extend from the X1 direction toward the X2 direction. However, the routes RT are not limited thereto. For example, all of the four routes RT may extend from the X2 direction toward the X1 direction or may extend from the X1 direction toward the X2 direction. In the example illustrated in FIG. 4, the start position PS_1 is located at an end of the route RT_1 in the X2 direction, and the end position PE_1 is located at an end of the route RT_1 in the X1 direction. The start position PS_2 is located at an end of the route RT_2 in the X1 direction, and the end position PE_2 is located at an end of the route RT_2 in the X2 direction. The start position PS_3 is located at an end of the route RT_3 in the X2 direction, and the end position PE_3 is located at an end of the route RT_3 in the X1 direction. The start position PS_4 is located at an end of the route RT_4 in the X1 direction, and the end position PE_4 is located at an end of the route RT_4 in the X2 direction.

A width D1X of the overlapping region DR_12 in the direction along the X axis may be longer than, shorter than, or equal to a width D2Y of the overlapping region DR_23 in the direction along the Y axis.

Figure 5:
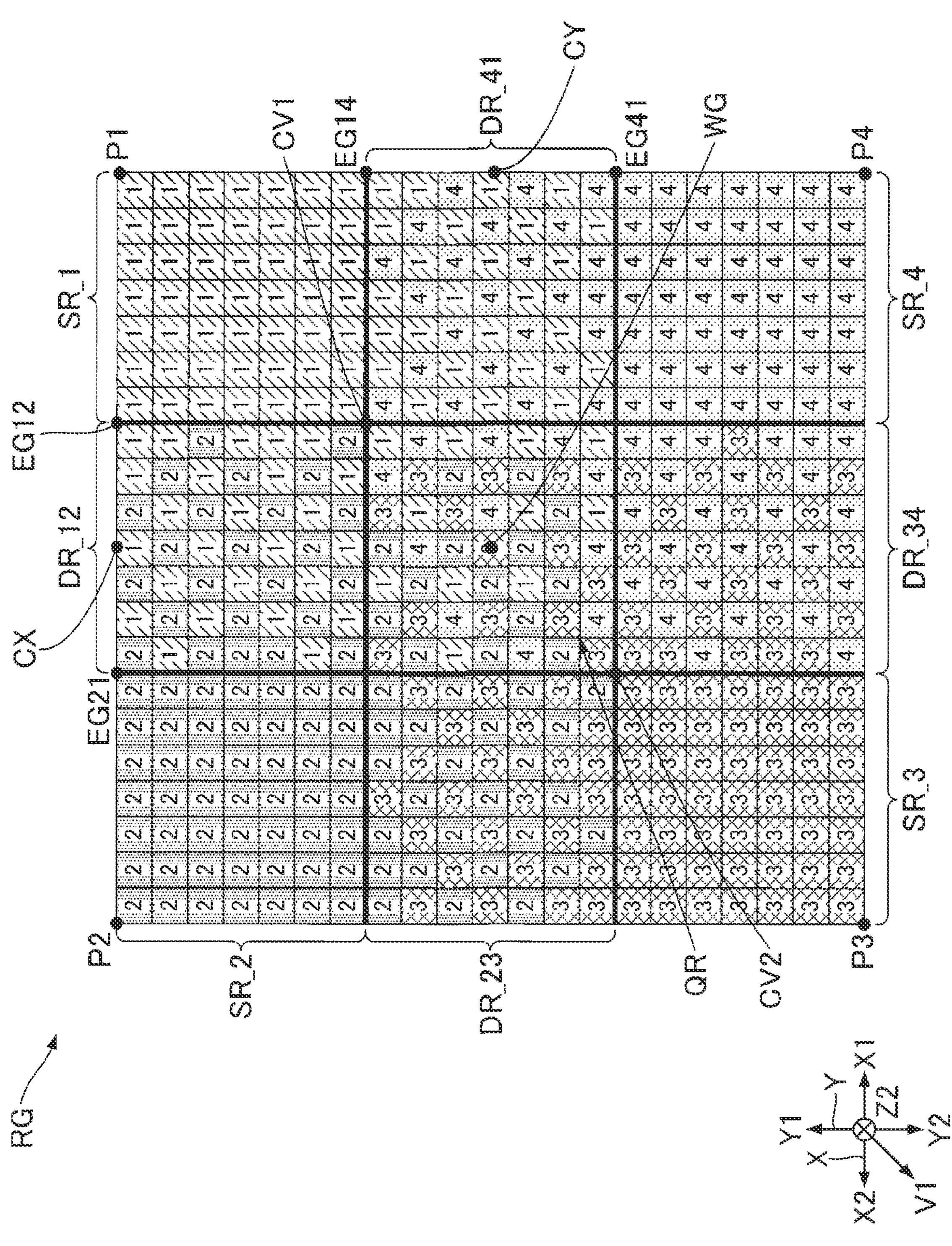
FIG. 5 is a diagram illustrating a state in which a region illustrated in FIG. 4 is enlarged.

FIG. 5 is a diagram illustrating a state in which a region RG illustrated in FIG. 4 is enlarged. The region RG is a rectangular region having a first vertex P1, a second vertex P2, a third vertex P3, and a fourth vertex P4. As is understood from FIG. 4, the first vertex P1 is included in the first band region BR_1. The second vertex P2 is included in the second band region BR_2. The third vertex P3 is included in the third band region BR_3. The fourth vertex P4 is included in the fourth band region BR_4.

As illustrated in FIG. 5, the region RG includes a part of the non-overlapping region SR_1, a part of the non-overlapping region SR_2, a part of the non-overlapping region SR_3, a part of the non-overlapping region SR_4, a part of the overlapping region DR_12, a part of the overlapping region DR_23, a part of the overlapping region DR_34, a part of the overlapping region DR_41, and the overlapping region QR. In FIG. 5, a point EG12 and a point EG21 are present on a side of the region RG between the first vertex P1 and the second vertex P2. The point EG12 is located at an end of a boundary between the non-overlapping region SR_1 and the overlapping region DR_12 in the Y1 direction. The point EG21 is located at an end of a boundary between the non-overlapping region SR_2 and the overlapping region DR_12 in the Y1 direction. Similarly, in FIG. 5, a point EG14 and a point EG41 are present on a side of the region RG between the first vertex P1 and the fourth vertex P4. The point EG14 is located at an end of a boundary between the non-overlapping region SR_1 and the overlapping region DR_41 in the X1 direction. The point EG41 is located at an end of a boundary between the non-overlapping region SR_4 and the overlapping region DR_41 in the X1 direction.

In the example illustrated in FIG. 5, each of rectangles in each of the non-overlapping regions SR, rectangles in each of the overlapping regions DR, and rectangles in the overlapping region QR indicates a single pixel. A number included in each of the pixels indicates a printing operation of applying an ink droplet to the pixel. For example, in FIG. 5, each of pixels having “1” assigned thereto is a pixel to which an ink droplet is applied by the first printing operation. That is, the first band region BR_1 is a region in which pixels having “1” assigned thereto are arranged. Each region in which pixels with two different numbers are arranged is an overlapping region DR in which two band regions overlap. In FIG. 5, to facilitate understanding, hatching patterns in the pixels differ for the numbers included in the pixels. The number of pixels included in each of the regions is an example and may be changed as appropriate according to the accuracy of the operation of the robot 2, the accuracy of positions at which ink droplets ejected from the head 3*a* land on the surface of the work W, and the like.

To simplify the description, FIG. 5 illustrates an example in which a print image on which ink droplets are applied to all pixels corresponding to the printing region Wa is formed. The print image is a so-called “solid image”. To form a partial image in each of the plurality of band regions BR in printing operations described later, the computer 7 generates the print data Img indicating the partial images for the plurality of band regions BR before the printing operations. In addition, the computer 7 generates the print data Img in such a way that the sum of recording ratios in the printing operations of applying ink droplets to the band regions BR is 100% in each of the regions in which two or more of the band regions BR overlap.

For example, in FIG. 5, in each of the non-overlapping region SR_1 in which all pixels have “1” assigned thereto, the non-overlapping region SR_2 in which all pixels have “2” assigned thereto, the non-overlapping region SR_3 in which all pixels have “3” assigned thereto, and the non-overlapping region SR_4 in which all pixels have “4” assigned thereto, the recording pixels are arranged in such a way that a recording ratio in a single printing operation is 100%. For example, since ink droplets are applied to the non-overlapping region SR_1 only by the first printing operation, a recording ratio in the first printing operation performed on the non-overlapping region SR_1 is 100%. Recording indicates applying an ink droplet onto the work by a printing operation. The recording pixels are pixels corresponding to positions that are included in the printing region Wa and at which ink droplets are applied. In addition, a recording ratio in a certain printing operation performed on a certain region is a ratio of the number of recording pixels to which ink droplets are applied by the certain printing operation to the number of all pixels corresponding to the certain region.

In each of the overlapping region DR_12 in which pixels have “1” assigned thereto and pixels have “2” assigned thereto, the overlapping region DR_23 in which pixels have “2” assigned thereto and pixels have “3” assigned thereto, the overlapping region DR_34 in which pixels have “3” assigned thereto and pixels have “4” assigned thereto, and the overlapping region DR_41 in which pixels have “4” assigned thereto and pixels have “1” assigned thereto, recording pixels in two regions are arranged in a mutually exclusive and interpolated manner. In other words, the recording pixels that are pixels to which ink droplets are applied are appropriately distributed and arranged in such a way that the sum of recording ratios in two printing operations is 100%. The arrangement of the recording pixels is implemented by applying a mask pattern stored in the computer 7 to the print image. Similarly, in the overlapping region QR in which pixels have “1” assigned thereto, pixels have “2” assigned thereto, pixels have “3” assigned thereto, and pixels have “4” assigned thereto, the recording pixels in the four regions are arranged in a mutually exclusive and interpolated manner. Therefore, the sum of recording ratios in the four printing operations is 100%.

In the example illustrated in FIG. 5, the computer 7 generates the print data Img in such a way that recording ratios in two printing operations of applying ink droplets to two band regions BR that overlap each other in the overlapping region QR are changed. The changes in the recording ratios are described below with reference to FIGS. 6 and 7.

Figure 6:
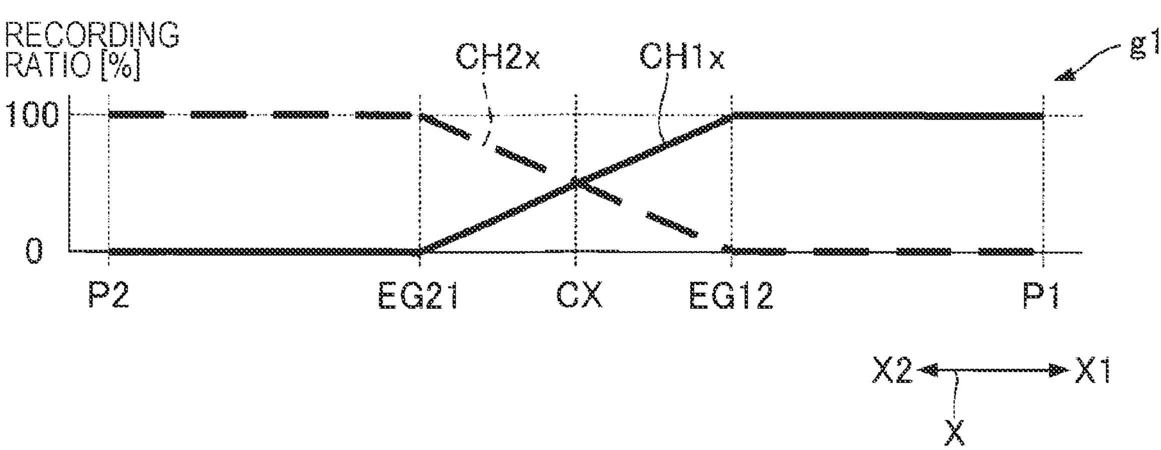
FIG. 6 is a diagram illustrating a change in a recording ratio in a region from a first vertex to a second vertex.

A graph g1 illustrated in FIG. 6 includes a change characteristic CH1*x* and a change characteristic CH2*x*. The change characteristic CH1*x* indicates a change in a recording ratio in the first printing operation performed in the direction along the X axis. The change characteristic CH2*x* indicates a change in a recording ratio in the second printing operation performed in the direction along the X axis. A graph g2 illustrated in FIG. 7 includes a change characteristic CH1*y* and a change characteristic CH4*y*. The change characteristic CH1*y* indicates a change in a recording ratio in the first printing operation performed in the direction along the Y axis. The change characteristic CH4*y* indicates a change in a recording ratio in the fourth printing operation performed in the direction along the Y axis.

As indicated by the change characteristic CH1*x*, a recording ratio in the first printing operation performed on peripheral pixels included in a representative section extending from the first vertex P1 to the point EG12 is 100%. A recording ratio in the first printing operation performed on peripheral pixels included in a representative section extending from the point EG12 to the point EG21 monotonically increases as a position within the representative section gets closer to the point EG12, and monotonically decreases as the position within the representative section gets closer to the point EG21. A recording ratio in the first printing operation performed on peripheral pixels included in a representative section extending from the point EG21 to the second vertex P2 is 0%.

As indicated by the change characteristic CH2*x*, a recording ratio in the second printing operation performed on the peripheral pixels included in the representative section extending from the second vertex P2 to the point EG21 is 100%. A recording ratio in the second printing operation performed on the peripheral pixels included in the representative section extending from the point EG21 to the point EG12 monotonically increases as a position within the representative section gets closer to the point EG21, and monotonically decreases as the position within the representative section gets closer to the point EG12. A recording ratio in the second printing operation performed on the peripheral pixels included in the representative section extending from the point EG12 to the first vertex P1 is 0%.

As is understood from FIGS. 5 and 6, the sum of the recording ratio in the first printing operation performed on the overlapping region DR_12 and the recording ratio in the second printing operation performed on the overlapping region DR_12 is 100% at all positions in a section extending from the first vertex P1 to the second vertex P2. For example, each of the recording ratio in the first printing operation performed on the midpoint CX between the point EG12 and the point EG21 and the recording ratio in the second printing operation performed on the midpoint CX is 50%.

In addition, as indicated by the change characteristic CH1*y*, a recording ratio in the first printing operation performed on peripheral pixels included in a representative section extending from the first vertex P1 to the point EG14 is 100%. A recording ratio in the first printing operation performed on peripheral pixels included in a representative section extending from the point EG14 to the point EG41 is monotonically increases as a position within the representative section gets closer to the point EG14, and monotonically decreases as the position within the representative section gets closer to the point EG41. A recording ratio in the first printing operation performed on peripheral pixels included in a representative section extending from the point EG41 to the fourth vertex P4 is 0%.

As indicated by the change characteristic CH4*y*, a recording ratio in the fourth printing operation performed on the peripheral pixels included in the representative section extending from the fourth vertex P4 to the point EG41 is 100%. A recording ratio in the fourth printing operation performed on the peripheral pixels included in the representative section extending from the point EG41 to the point EG14 monotonically increases as a position within the representative section gets closer to the point EG41, and monotonically decreases as the position within the representative section gets closer to the point EG14. A recording ratio in the fourth printing operation performed on the peripheral pixels included in the representative section extending from the point EG14 to the first vertex P1 is 0%.

Figure 7:
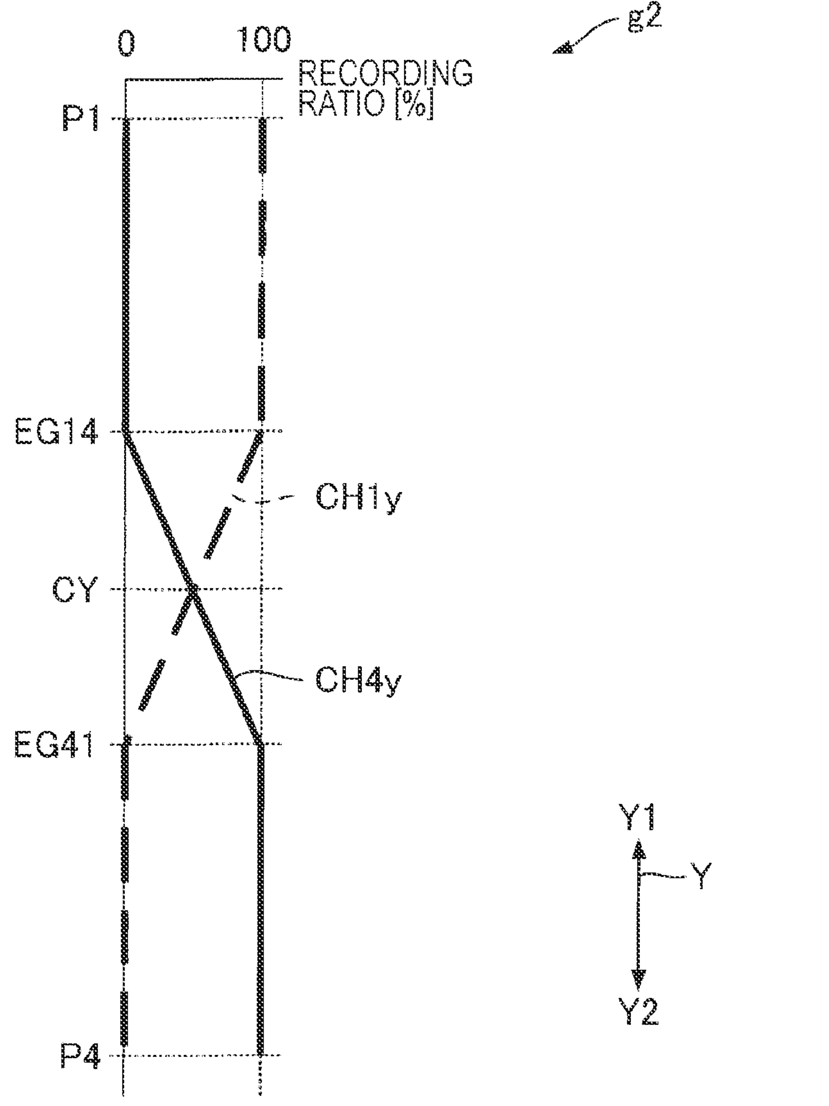
FIG. 7 is a diagram illustrating a change in a recording ratio in a region from the first vertex to a fourth vertex.

As is understood from FIGS. 5 and 7, the sum of the recording ratio in the first printing operation performed on the overlapping region DR_41 and the recording ratio in the fourth printing operation performed on the overlapping region DR_41 is 100% at all positions in a section extending from the first vertex P1 to the fourth vertex P4. For example, each of the recording ratio in the first printing operation performed on the midpoint CY between the point EG14 and the point EG41 and the recording ratio in the fourth printing operation performed on the midpoint CY is 50%.

As described above, the recording ratio in the printing operation in the direction from the first vertex P1 to the second vertex P2, that is, in the direction along the X axis, and the recording ratio in the printing operation in the direction from the first vertex P1 to the fourth vertex P4, that is, in the direction along the Y axis monotonically change. The directions in which the printing operations are performed at the recording ratios that monotonically change are not limited to the direction along the X axis and the direction along the Y axis. For example, recording ratios in the printing operations in a V1 direction illustrated in FIG. 5 monotonically change. The V1 direction is a direction obtained by rotating the Y2 direction by 45 degrees clockwise as viewed from the Z2 direction.

Changes in the recording ratios in the printing operations in the V1 direction are described below using the first vertex P1, a point CV1, a point WG, a point CV2, and the third vertex P3. The point CV1 is located at a vertex of the non-overlapping region SR_1 in the X2 direction and in the Y2 direction. The point CV2 is located at a vertex of the non-overlapping region SR_3 in the X1 direction and the Y1 direction. The point WG is the center of gravity of the printing region Wa and is the midpoint between the CV1 and the point CV2. The first vertex P1, the point CV1, the point WG, the point CV2, and the third vertex P3 are arranged on a single straight line extending in the V1 direction. A recording ratio in the first printing operation performed on peripheral pixels included in a representative section extending from the first vertex P1 to the point CV1 is 100%. A recording ratio in the first printing operation performed on peripheral pixels included in a representative section extending from the point CV1 to the point CV2 illustrated in FIG. 5 monotonically decreases as a position within the representative section gets closer to the point CV2. A recording ratio in the first printing operation performed on peripheral pixels included in a representative section extending from the point CV2 to the third vertex P3 is 0%. For example, each of a recording ratio in the first printing operation performed on the WG, a recording ratio in the second printing operation performed on the WG, a recording ratio in the third printing operation performed on the WG, and a recording ratio in the fourth printing operation performed on the WG is 25%.

As described above, by changing the recording ratios in the printing operations in the overlapping regions DR step by step, it is possible to suppress a noticeable difference between images in the overlapping regions DR and images in the non-overlapping regions SR. FIG. 5 illustrates the pixels arranged on the flat surface as a set of squares for easy understanding. The pixels may be three-dimensionally arranged. The pixels may be arranged as a set of cuboids, a set of spheres, a set of three-dimensional coordinate information, or the like.

In the present embodiment, the computer 7 generates the print data Img in such a way that the recording ratios in the printing operations in the overlapping regions DR are changed. However, the computer 7 may not be limited thereto. For example, the computer 7 may generate the print data Img in such a way that the recording ratios in the printing operations in the overlapping regions DR are fixed.

1-5. Operation and Printing Method of Printing Apparatus 1

Figure 8:
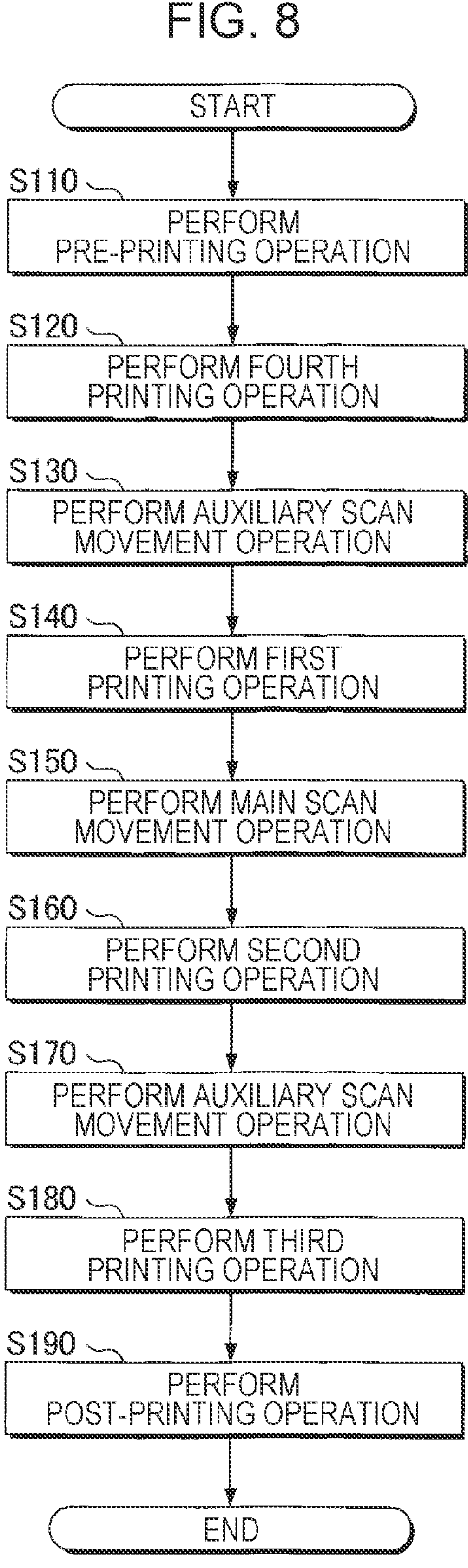
FIG. 8 is a flowchart illustrating a procedure for a printing method according to the first embodiment.

FIG. 8 is a flowchart illustrating a procedure for a printing method according to the first embodiment. The three-dimensional printing method is performed using the printing apparatus 1 described above. A series of operations illustrated in FIG. 8 is performed by the computer 7 controlling the robot 2 and the head unit 3 via the controller 5 and the control module 6.

As illustrated in FIG. 8, the printing apparatus 1 performs, as a plurality of printing operations, the fourth printing operation of ejecting the ink onto the fourth band region BR_4, the first printing operation of ejecting the ink onto the first band region BR_1, the second printing operation of ejecting the ink onto the second band region BR_2, and the third printing operation of ejecting the ink onto the third band region BR_3 in this order.

In step S110, the printing apparatus 1 performs a pre-printing operation. The pre-printing operation in step S110 is an operation of the robot 2 to change a relative position of the head 3*a* with respect to the work W before the printing operations. In the pre-printing operation, the head 3*a* does not eject the ink. The pre-printing operation includes, for example, an operation of the robot 2 to move the head 3*a* from a position where a cap (not illustrated) for covering the nozzle surface FN is disposed to a position immediately above the start position PS_4 in the fourth band region BR_4 corresponding to the fourth printing operation to be performed first among the plurality of printing operations.

After the end of step S110, the printing apparatus 1 performs the fourth printing operation to apply an ink droplet to the fourth band region BR_4 in step S120. The fourth printing operation is one of the plurality of printing operations. The printing operations are operations of ejecting the ink from the head 3*a* while causing the robot 2 to change a relative position of the head 3*a* with respect to the work W along the X axis.

To form a partial image in each of the plurality of band regions BR in the printing operations, the computer 7 generates the print data Img indicating the partial images corresponding to the respective band regions BR before the printing operations. The generation of the print data Img by the computer 7 is described above.

After the end of step S120, the printing apparatus 1 performs an auxiliary scan movement operation in step S130. The auxiliary scan movement operation is an operation of the robot 2 to move the head 3*a* to a position immediately above a start position PS in a band region BR corresponding to the next printing operation. In the auxiliary scan movement operation, the work W is not moved by the work moving mechanism 8. In the present embodiment, the head 3*a* is moved by the auxiliary scan movement operation from a position immediately above an end position PE to a position immediately above a start position PS in a band region BR corresponding to the next printing operation. In the auxiliary scan movement operation in step S130, the head 3*a* is moved from a position immediately above the end position PE_4 to a position immediately above the start position PS_1 in the first band region BR_1 corresponding to the first printing operation that is the next printing operation. During the execution of the auxiliary scan movement operation, the head 3*a* does not eject the ink.

After the end of step S130, the printing apparatus 1 performs the first printing operation to apply an ink droplet to the first band region BR_1 in step S140. The first printing operation is one of the plurality of printing operations. After the end of step S140, the printing apparatus 1 performs the main scan movement operation in step S150. In the present embodiment, in the main scan movement operation, the work moving mechanism 8 moves the work W in the X1 direction. A range in which the head 3*a* can be moved is relatively moved in the X2 direction by the movement of the work W in the X1 direction. In this case, the work W may be moved to the extent that the range in which the head 3*a* can be moved is included in the band region BR corresponding to the next printing operation. In the present embodiment, while the robot 2 is almost not operated along the X axis, the head 3*a* is moved by the execution of the main scan operation from a position immediately above the end position PE_1 of the first printing operation to a position immediately above the start position PS_2 of the second printing operation. Therefore, after performing the main scan movement operation, the printing apparatus 1 can perform the second printing operation without performing the auxiliary scan movement operation. However, when the route RT_1 and the route RT_2 are set to be shifted from each other in the direction along the Y axis as viewed along the Z axis, the auxiliary scan movement operation is performed by the robot 2 in addition to the main scan movement operation by the work moving mechanism 8 in the time period between the first printing operation and the second printing operation. In this case, it is possible to provide the overlapping region DR_12 in which an end portion of the first band region BR_1 in the X2 direction overlaps an end portion of the second band region BR_2 in the X1 direction.

After the end of step S150, the printing apparatus 1 performs the second printing operation to apply an ink droplet to the second band region BR_2 in step S160. After the end of step S160, the printing apparatus 1 performs the auxiliary scan movement operation in step S170. In the auxiliary scan movement operation in step S170, the head 3*a* is moved from a position immediately above the end position PE_2 to a position immediately above the start position PS in the third band region BR_3 corresponding to the third printing operation that is the next printing operation.

After the end of step S170, the printing apparatus 1 performs the third printing operation to apply an ink droplet to the third band region BR_3 in step S180. After the end of step S180, the printing apparatus 1 performs a post-printing operation in step S190. The post-printing operation includes, for example, an operation of the robot 2 to move the head 3*a* from a position immediately above the end position PE_3 in the third band region BR_3 to another position that is, for example, the position where the above-described cap is disposed. After the end of step S190, the printing apparatus 1 ends the series of operations illustrated in FIG. 8.

As is understood from FIG. 8, the main scan movement operation is performed by the work moving mechanism 8 only in step S150. That is, the relative position of the base portion 210 with respect to the work W is maintained for a time period from the start of the fourth printing operation to the end of the first printing operation and for a time period from the start of the second printing operation to the end of the third printing operation.

As is understood from FIG. 8, the printing apparatus 1 performs the fourth printing operation, the first printing operation, the main scan movement operation, the second printing operation, and the third printing operation in this order. That is, the main scan movement operation is performed after the first printing operation and the fourth printing operation and before the second printing operation and the third printing operation. However, the order in which the plurality of printing operations and the main scan movement operation are performed is not limited thereto. For example, the printing apparatus 1 may perform the third printing operation, the second printing operation, the main scan movement operation, the first printing operation, and the fourth printing operation in this order. In this case, the main scan movement operation is performed before the first printing operation and the fourth printing operation and after the second printing operation and the third printing operation.

1-6. Summary of First Embodiment

As described above, the printing apparatus 1 according to the first embodiment includes the head 3*a* that ejects the ink, the arm 226 that is the distal end portion supporting the head 3*a*, and the base portion 210. The printing apparatus 1 further includes the robot 2 that changes the relative position of the head 3*a* with respect to the base portion 210, and the work moving mechanism 8 that moves the base portion 210 relative to the work W. The plurality of printing operations in which the robot 2 moves the head 3*a* in the main scan direction and the head 3*a* ejects the ink to the printing region Wa on the work W, is performed. The plurality of printing operations include the first printing operation in which the head 3*a* ejects the ink onto the first band region BR_1 in the printing region Wa, and the second printing operation in which the head 3*a* ejects the ink onto the second band region BR_2 in the printing region Wa. The main scan movement operation in which the moving mechanism 8 moves the base portion 210 relative to the work W in the main scan direction in the time period between the first printing operation and the second printing operation, is performed. The first band region BR_1 is adjacent to the second band region BR_2 in the main scan direction. The printing region Wa includes the overlapping region DR_12 in which the first band region BR_1 overlaps the second band region BR_2.

According to the first embodiment, since the first band region BR_1 is adjacent to the second band region BR_2 in the main scan direction, it is possible to print an image or the like in a relatively wide range such as a range wider than the range in which the head 3*a* can be moved by the robot 2. In addition, according to the first embodiment, since the overlapping regions DR are provided, even when at least one of the first band region BR_1 and the second band region BR_2 shifts, it is possible to suppress the occurrence of a white streak and a black streak and thus possible to suppress a reduction in the quality of an image. Referring to FIG. 4, for example, when the first band region BR_1 shifts away from the second band region BR_2, only the width of the overlapping region DR_1 is reduced and it is possible to suppress the occurrence of a gap to which the ink does not adhere, that is, the occurrence of a white streak. On the other hand, when the first band region BR_1 shifts closer to the second band region BR_2, a region in which the non-overlapping region SR_2 of the second band region BR_2 overlaps the overlapping region DR_12 occurs. As described above, since the recording ratio in the first printing operation performed on the overlapping region DR_12 is lower than 100%, an overlapping degree of ink droplets in the non-overlapping region SR_2 and the overlapping region DR_12 is lower than an overlapping degree of ink droplets in the non-overlapping region SR_2 and the non-overlapping region SR_1. Therefore, according to the first embodiment, it is possible to suppress a black streak. As described above, according to the first embodiment, even when an image or the like is printed in a range that is relatively wide in the main scan direction, such as a range wider than the range in which the head 3*a* can be moved by the robot 2, it is possible to suppress the occurrence of a white streak and a black streak and suppress a reduction in the quality of the image.

In addition, the plurality of printing operations include the third printing operation in which the head 3*a* ejects the ink onto the third band region BR_3 in the printing region Wa. The second band region BR_2 is adjacent to the third band region BR_3 in the auxiliary scan direction intersecting the main scan direction.

According to the first embodiment, it is possible to print an image or the like in a range that is wide in the auxiliary scan direction.

In addition, the work moving mechanism 8 maintains the relative position of the base portion 210 with respect to the work W in a time period between the second printing operation and the third printing operation.

In the second printing operation and the third printing operation, the work moving mechanism 8 does not move the head 3*a*, and only the robot 2 is operated. Therefore, according to the first embodiment, it is possible to shorten takt time for producing a product and improve the productivity, as compared with an aspect in which the head 3*a* is moved by the work moving mechanism 8 and the robot 2 in the time period between the second printing operation and the third printing operation. In addition, according to the first embodiment, since the head 3*a* is not moved by the work moving mechanism 8 in the time period between the second printing operation and the third printing operation, it is possible to suppress a reduction in the accuracy of the position of the head 3*a*, as compared with the aspect in which the head 3*a* is moved by the work moving mechanism 8 and the robot 2 in the time period between the second printing operation and the third printing operation.

The overlapping region DR_23 in which the second band region BR_2 overlaps the third band region BR_3 is provided.

Since the overlapping region DR_23 is present, it is possible to suppress the occurrence of a white streak and a black streak even in the auxiliary scan direction and suppress a reduction in the quality of an image.

In addition, a width D1X that is a length of the overlapping region DR_12 in the main scan direction may be longer than a width D2Y that is a length of the overlapping region DR_23 in the auxiliary scan direction.

Each of the band regions BR has a shape elongated in the main scan direction. Therefore, when the main scan movement operation and the auxiliary scan movement operation are compared, an amount by which the head 3*a* is moved by the main scan movement operation is larger than an amount by which the head 3*a* is moved by the auxiliary scan movement operation. As an amount by which the head 3*a* is moved increases, the position of the head 3*a* more easily shifts. That is, an amount by which the head 3*a* shifts in the main scan direction may be larger than an amount by which the head 3*a* shifts in the auxiliary scan direction. Therefore, according to the first embodiment, it is possible to suppress the occurrence of a white streak and a black streak, as compared with an aspect in which the width D1X is shorter than the width D2Y.

In addition, the printing apparatus 1 performs the main scan movement operation and the first printing operation before or after the second printing operation and the third printing operation.

Since the second band region BR_2 is adjacent to the third band region BR_3 in the auxiliary scan direction, when the first printing operation is not performed in the time period between the second printing operation and the third printing operation, the main scan movement operation may not be performed. Meanwhile, when the first printing operation is performed in the time period between the second printing operation and the third printing operation, the main scan movement operation is performed twice. Therefore, according to the first embodiment, it is possible to shorten takt time for producing a product and improve the productivity, as compared with a case where the first printing operation is performed in the time period between the second printing operation and the third printing operation.

The plurality of printing operations include the fourth printing operation in which the head 3*a* ejects the ink onto the fourth band region BR_4 in the printing region Wa. The third band region BR_3 is adjacent to the fourth band region BR_4 in the main scan direction. The printing region Wa includes the overlapping region DR_34 in which the third band region BR_3 overlaps the fourth band region BR_4. The first band region BR_1 is adjacent to the fourth band region BR_4 in the auxiliary scan direction. The printing region Wa includes the overlapping region DR_41 in which the first band region BR_1 overlaps the fourth band region BR_4.

According to the first embodiment, since the overlapping region DR_34 is provided, even when the third band region BR_3 and the fourth band region BR_4 shift, it is possible to suppress the occurrence of a white streak and a black streak, like the overlapping region DR_12. In addition, according to the first embodiment, since the overlapping region DR_41 is provided, even when the fourth band region BR_4 and the first band region BR_1 shift, it is possible to suppress the occurrence of a white streak and a black streak, like the overlapping region DR_12.

The printing region Wa includes the overlapping region QR in which the first band region BR_1, the second band region BR_2, and the third band region BR_3 overlap. In the overlapping region QR, the first band region BR_1, the second band region BR_2, the third band region BR_3, and the fourth band region BR_4 overlap.

In addition, the main scan movement operation is performed before the first printing operation and the fourth printing operation and after the second printing operation and the third printing operation or is performed after the first printing operation and the fourth printing operation and before the second printing operation and the third printing operation. In other words, the printing apparatus 1 does not perform the main scan movement operation in a time period between the first printing operation and the fourth printing operation and does not perform the main scan movement operation in the time period between the second printing operation and the third printing operation.

Since the first band region BR_1 is adjacent to the fourth band region BR_4 in the auxiliary scan direction, when the second printing operation or the third printing operation is not performed in the time period between the first printing operation and the fourth printing operation, the main scan movement operation may not be performed. Therefore, according to the first embodiment, it is possible to shorten takt time for producing a product and improve the productivity, as compared with a case where the second printing operation or the third printing operation is performed in the time period between the first printing operation and the fourth printing operation.

2. Modifications

Each embodiment exemplified above can be variously modified. Aspects of specific modifications are exemplified as follows. Two or more aspects arbitrarily selected from the modifications exemplified may be appropriately combined to the extent that the aspects are not mutually inconsistent.

The division of the printing region Wa is not limited to the example illustrated in FIG. 4. Other aspects of the division of the printing region Wa are described below.

2-1. First Modification

Figure 9:
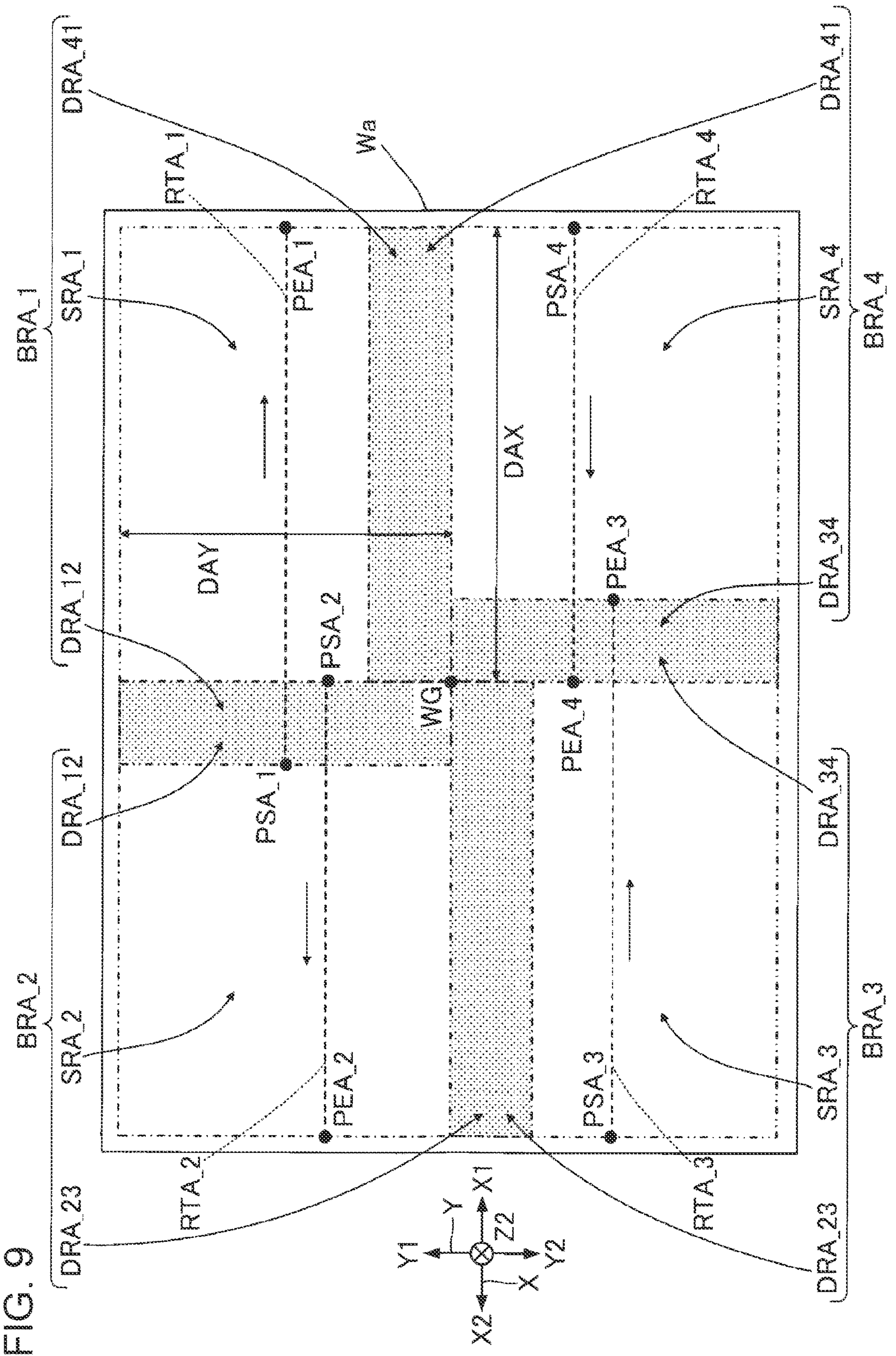
FIG. 9 is a diagram illustrating an example of division of a printing region according to a first modification.

FIG. 9 is a diagram illustrating an example of division of a printing region Wa according to a first modification. In FIG. 9, the printing region Wa includes a first band region BRA_1, a second band region BRA_2, a third band region BRA_3, and a fourth band region BRA_4. In the following description, the first band region BRA_1, the second band region BRA_2, the third band region BRA_3, and the fourth band region BRA_4 may be collectively referred to as band regions BRA without being distinguished. In addition, routes in the band regions BRA may be collectively referred to as routes RTA. Start positions of the routes RTA may be collectively referred to as start positions PSA. End positions of the routes RTA may be collectively referred to as end positions PEA.

The band regions BRA are different from the band regions BR in that the band regions BRA do not include an overlapping region QR. That is, in the first modification, three or more of the band regions BRA do not overlap. Specifically, the first band region BRA_1 includes a non-overlapping region SRA_1, an overlapping region DRA_12, and an overlapping region DRA_41.

The second band region BRA_2 includes a non-overlapping region SRA_2, the overlapping region DRA_12, and an overlapping region DRA_23. The third band region BRA_3 includes a non-overlapping region SRA_3, the overlapping region DRA_23, and an overlapping region DRA_34. The fourth band region BRA_4 includes a non-overlapping region SRA_4, the overlapping region DRA_34, and the overlapping region DRA_41. The overlapping region DRA_12 is a region in which the first band region BRA_1 overlaps the second band region BRA_2. The overlapping region DRA_23 is a region in which the second band region BRA_2 overlaps the third band region BRA_3. The overlapping region DRA_34 is a region in which the third band region BRA_3 overlaps the fourth band region BRA_4. The overlapping region DRA_41 is a region in which the fourth band region BRA_4 overlaps the first band region BRA_1.

As illustrated in FIG. 9, a length of the first band region BRA_1 in the direction along the Y axis is substantially equal to a length of the non-overlapping region SRA_2 in the direction along the Y axis and is a length DAY. In addition, a length of the non-overlapping region SRA_1 in the direction along the X axis is substantially equal to a length of the fourth band region BRA_4 in the direction along the Y axis and is a length DAX. In the example illustrated in FIG. 9, the start position PSA_2, the center WG of gravity, and the end position PEA_4 are located on a straight line parallel to the Y axis.

2-2. Second Modification

Figure 10:
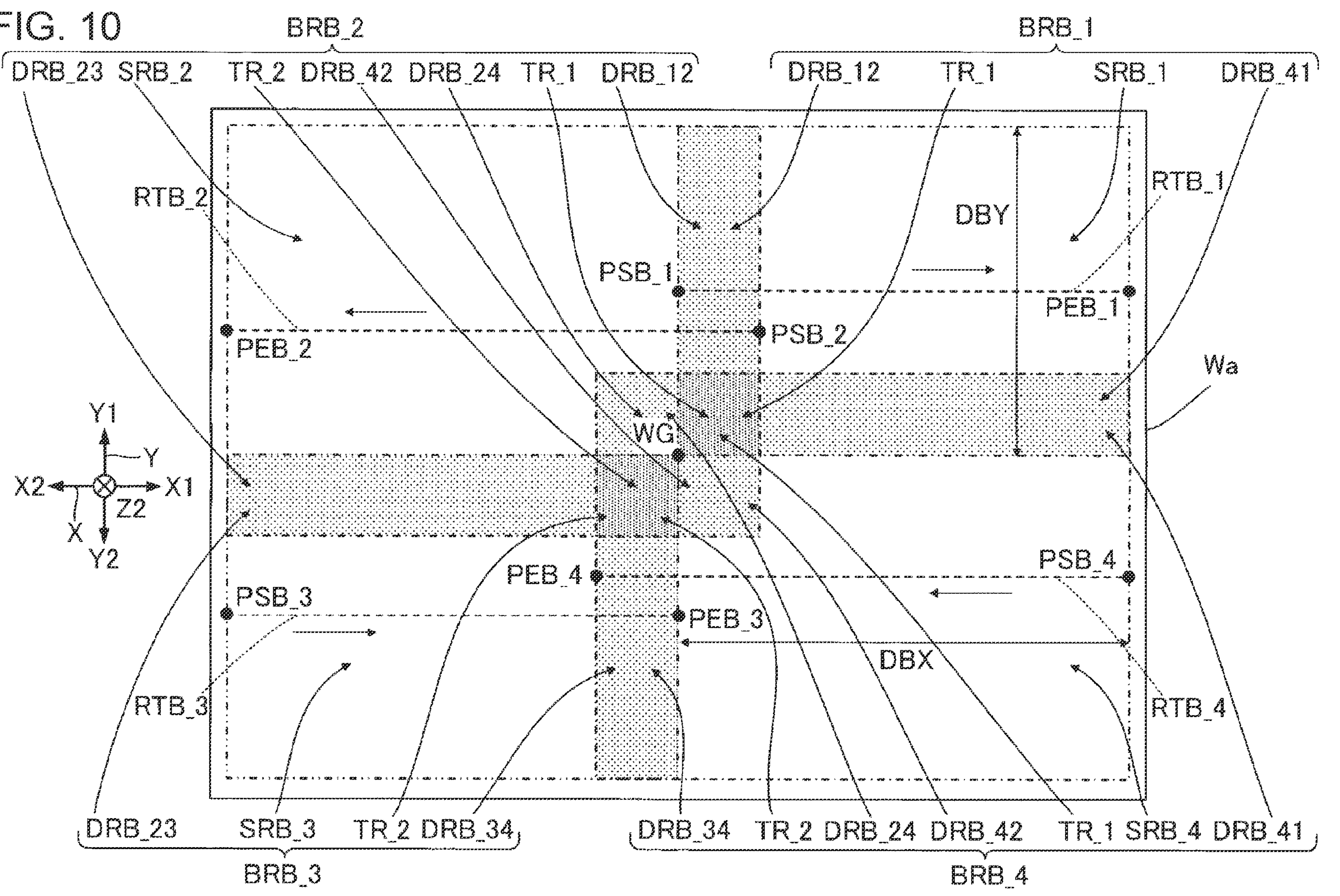
FIG. 10 is a diagram illustrating an example of division of a printing region according to a second modification.

FIG. 10 is a diagram illustrating an example of division of a printing region Wa according to a second modification. In FIG. 10, the printing region Wa includes a first band region BRB_1, a second band region BRB_2, a third band region BRB_3, and a fourth band region BRB_4. In the following description, the first band region BRB_1, the second band region BRB_2, the third band region BRB_3, and the fourth band region BRB_4 may be collectively referred to as band regions BRB without being distinguished. In addition, routes in the band regions BRB may be collectively referred to as routes RTB. Start positions of the routes RTB may be collectively referred to as start positions PSB. End positions of the routes RTB may be collectively referred to as end positions PEB.

The band regions BRB are different from the band regions BR in that each of the band regions BRB includes an overlapping region TR and does not include an overlapping region QR. That is, in the second modification, a region in which all of the four band regions BRB overlap is not present. Each overlapping region TR is a region in which three of the four band regions BRB overlap and the other one of the four band regions BRB does not overlap.

The first band region BRB_1 includes a non-overlapping region SRB_1, an overlapping region DRB_12, an overlapping region TR_1, and an overlapping region DRB_41.

In the overlapping region TR_1, the first band region BRB_1, the second band region BRB_2, and the fourth band region BRB_4 overlap and the third band region BRB_3 does not overlap.

The second band region BRB_2 includes a non-overlapping region SRB_2, the overlapping region DRB_12, the overlapping region TR_1, an overlapping region DRB_24, an overlapping region DRB_42, an overlapping region TR_2, and an overlapping region DRB_23. In the overlapping region TR_2, the second band region BRB_2, the third band region BRB_3, and the fourth band region BRB_4 overlap and the first band region BRB_1 does not overlap.

The third band region BRB_3 includes a non-overlapping region SRB_3, the overlapping region DRB_23, the overlapping region TR_2, and an overlapping region DRB_34. The fourth band region BRB_4 includes a non-overlapping region SRB_4, the overlapping region DRB_34, the overlapping region TR_1, the overlapping region DRB_24, the overlapping region DRB_42, the overlapping region TR_2, and the overlapping region DRB_41. As is understood from FIG. 10, in the second modification, the printing region Wa includes the overlapping regions DRB_24 and DRB_42 arranged diagonally to each other overlap each other. In each of the overlapping regions DRB_24 and DRB_42, the second band region BRB_2 overlaps the fourth band region BRB_4.

As illustrated in FIG. 10, a length of the first band region BRB_1 in the direction along the Y axis is substantially equal to a length of the non-overlapping region SRB_2 in the direction along the Y axis and is a length DBY. In addition, a length of the first band region BRB_1 in the direction along the X axis is substantially equal to a length of the non-overlapping region SRB_4 in the direction along the Y axis and is a length DBX. In the example illustrated in FIG. 10, the start position PSB_1, the center WG of gravity, and the end position PEB_3 are located on a straight line parallel to the Y axis.

In the second modification, the overlapping region TR_2 corresponds to an "eighth overlapping region", and the overlapping region TR_1 corresponds to a "ninth overlapping region".

In the second modification, the printing region Wa does not include a region in which the first band region BR_1, the second band region BR_2, the third band region BR_3, and the fourth band region BR_4 overlap. In the second modification, the printing region Wa includes the overlapping region TR_1 in which the three of the first band region BR_1, the second band region BR_2, the third band region BR_3, and the fourth band region BR_4 overlap and the other one of the first band region BR_1, the second band region BR_2, the third band region BR_3, and the fourth band region BR_4 does not overlap. In the second modification, the printing region Wa includes the overlapping region TR_2 in which the three of the first band region BR_1, the second band region BR_2, the third band region BR_3, and the fourth band region BR_4 overlap and the other one of the first band region BR_1, the second band region BR_2, the third band region BR_3, and the fourth band region BR_4 does not overlap. A combination of the overlapping band regions BR in the overlapping region TR_1 is different from a combination of the overlapping band regions BR in the overlapping region TR_2.

In the first embodiment, in the overlapping region QR included in the printing region Wa, when the position of any one of the four band regions BR shifts, the quality of an image decreases. On the other hand, in the second modification, an overlapping region QR is divided into the overlapping region TR_1 and the overlapping region TR_2. Since the three band regions BR overlap in each of the overlapping region TR_1 and the overlapping region TR_2, a probability that the position of at least one of the band regions BR shifts decreases, as compared with the overlapping region QR in which the four band regions BR overlap. Therefore, it is possible to suppress a reduction in the quality of an image.

In the first embodiment, as is understood from FIG. 4, all of the four band regions BR according to the first embodiment have shapes that are substantially the same. Therefore, many nozzles are easily used in each printing operation and the sizes of the band regions BR are easily set to the maximum size, as compared with the second modification. Therefore, in the first embodiment, the number of band regions may be reduced, as compared with the second modification in which the sizes of the band regions BR are different.

2-3. Third Modification

Figure 11:
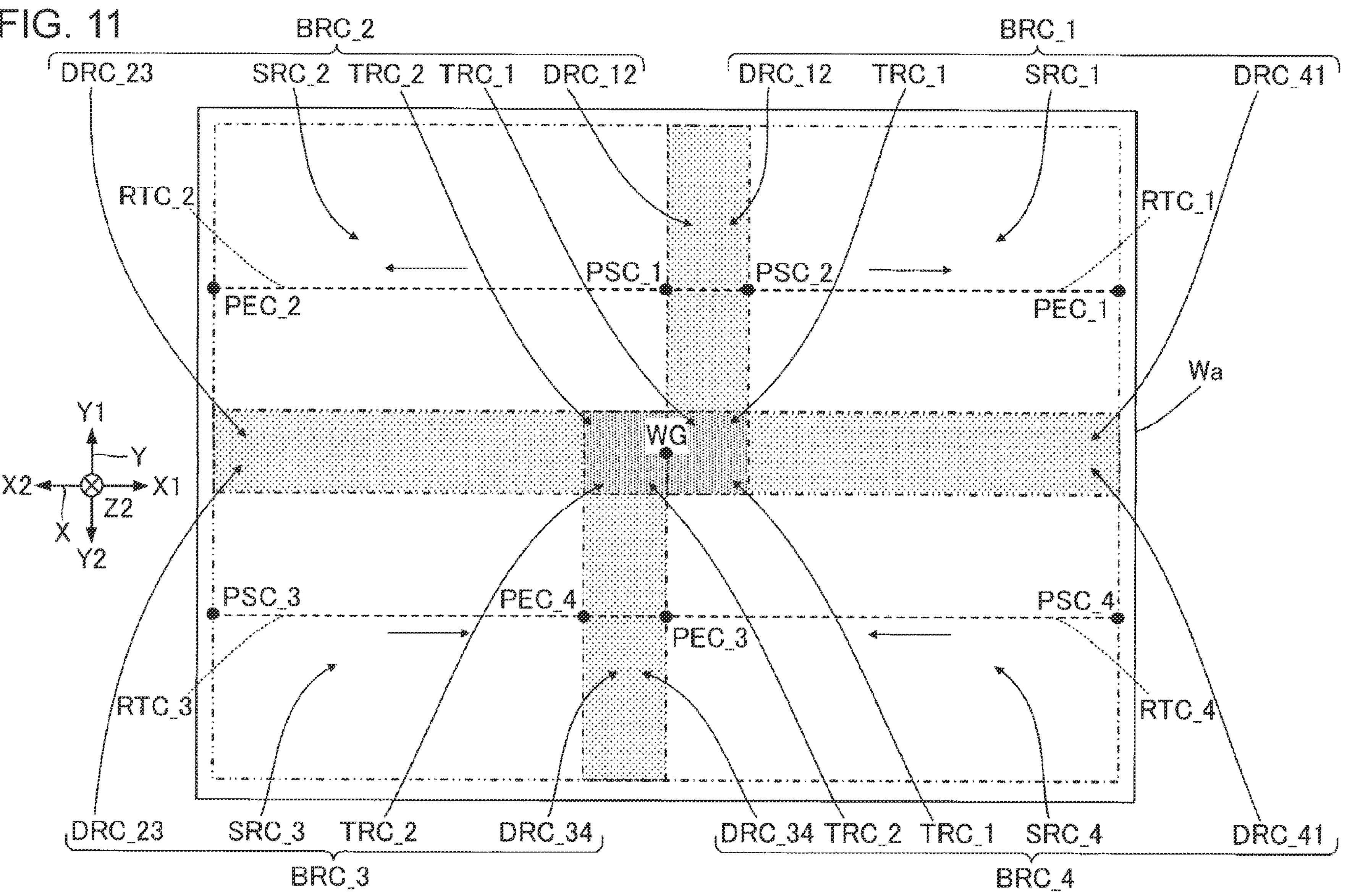
FIG. 11 is a diagram illustrating an example of division of a printing region according to a third modification.

FIG. 11 is a diagram illustrating an example of division of a printing region Wa according to a third modification. In FIG. 11, the printing region Wa includes a first band region BRC_1, a second band region BRC_2, a third band region BRC_3, and a fourth band region BRC_4. In the following description, the first band region BRC_1, the second band region BRC_2, the third band region BRC_3, and the fourth band region BRC_4 may be referred to as band regions BRC without being distinguished. In addition, routes in the band regions BRC may be collectively referred to as routes RTC. Start positions of the routes RTC may be collectively referred to as start positions PSC. End positions of the routes RTC may be collectively referred to as end positions PEC.

In the third modification, two overlapping regions TR in which three of the band regions BR overlap are arranged in the direction along the X axis. Specifically, the first band region BRC_1 includes a non-overlapping region SRC_1, an overlapping region DRC_12, an overlapping region TRC_1, and an overlapping region DRC_41. In the overlapping region TRC_1, the first band region BRC_1, the second band region BRC_2, and the fourth band region BRC_4 overlap and the third band region BRC_3 does not overlap.

The second band region BRC_2 includes a non-overlapping region SRC_2, the overlapping region DRC_12, the overlapping region TRC_1, an overlapping region TRC_2, and an overlapping region DRC_23. In the overlapping region TRC_2, the second band region BRC_2, the third band region BRC_3, and the fourth band region BRC_4 overlap and the first band region BRC_1 does not overlap.

The third band region BRC_3 includes a non-overlapping region SRC_3, the overlapping region DRC_23, the overlapping region TRC_2, and an overlapping region DRC_34. The fourth band region BRC_4 includes a non-overlapping region SRC_4, the overlapping region DRC_34, the overlapping region TRC_1, the overlapping region TRC_2, and the overlapping region DRC_41. In the example illustrated in FIG. 11, the start position PSC_1, the center WG of gravity, and the end position PEC_3 are located on a straight line parallel to the Y axis. The overlapping region TRC_1 is adjacent to the overlapping region TRC_2 in the direction along the X axis.

In the third modification, the overlapping region TRC_2 corresponds to the "eighth overlapping region", and the overlapping region TRC_1 corresponds to the "ninth overlapping region".

In the third modification, the overlapping region TRC_1 is adjacent to the overlapping region TRC_2 in the direction along the X axis, but the two overlapping regions TRC_1 and TRC_2 are not limited thereto. For example, the two overlapping regions TR in which the three band regions BR overlap may be adjacent to each other in the direction along the Y axis. However, in this case, a width of each of the band regions BR in the direction along the Y axis needs to be changed or the positions of the routes RT in the direction along the Y axis in each printing operation need to be different. Therefore, as in the third modification, it is preferable that the overlapping region TRC_1 be adjacent to the overlapping region TRC_2 in the direction along the X axis.

2-4. Fourth Modification

Figure 12:
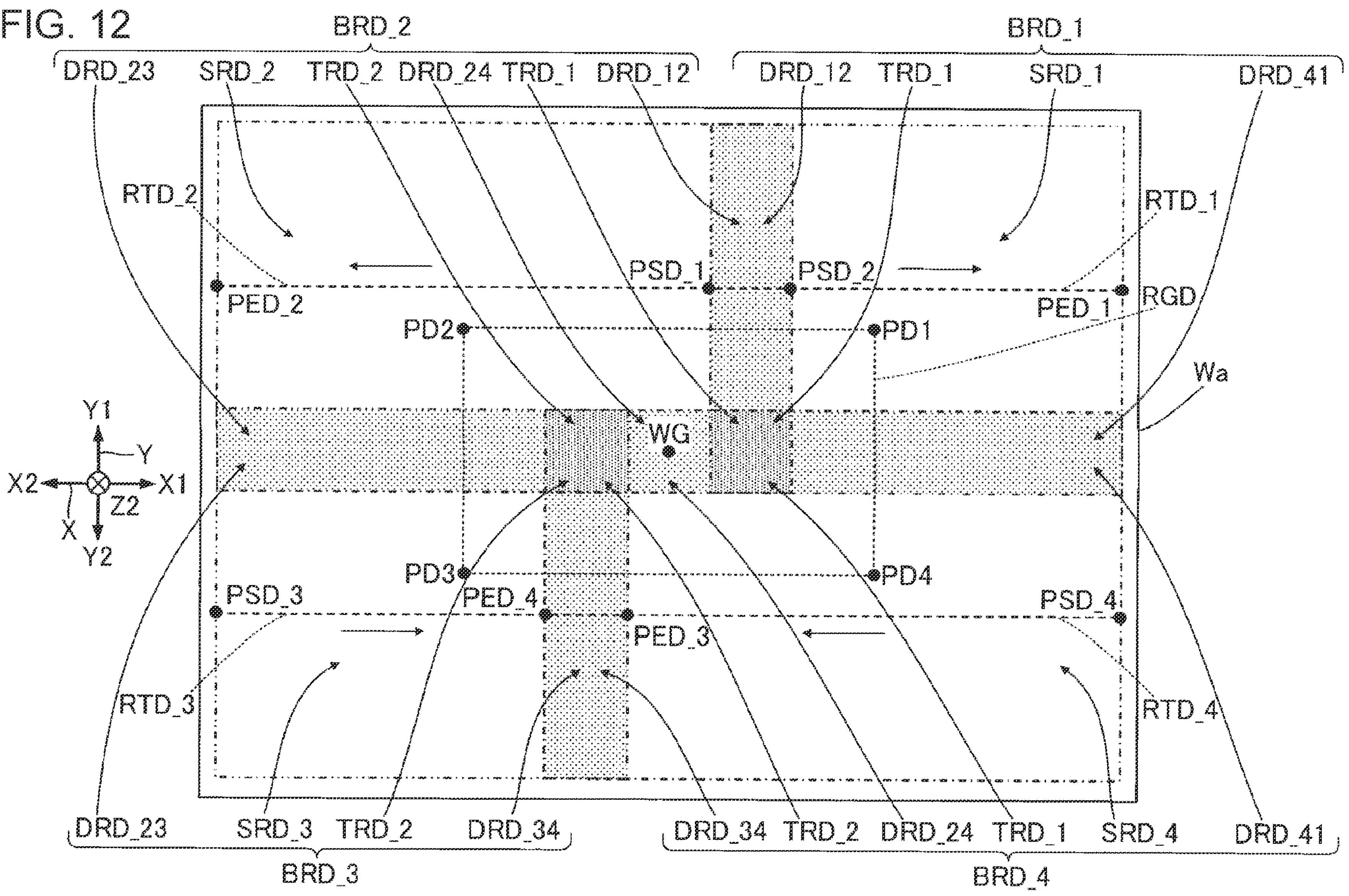
FIG. 12 is a diagram illustrating an example of division of a printing region according to a fourth modification.

FIG. 12 is a diagram illustrating an example of division of a printing region Wa according to a fourth modification. In FIG. 12, the printing region Wa includes a first band region BRD_1, a second band region BRD_2, a third band region BRD_3, and a fourth band region BRD_4. In the following description, the first band region BRD_1, the second band region BRD_2, the third band region BRD_3, and the fourth band region BRD_4 may be collectively referred to as band regions BRD without being distinguished. In addition, routes in the band regions BRD may be collectively referred to as routes RTD. Start positions of the routes RTD may be collectively referred to as start positions PSD. End positions of the routes RTD may be collectively referred to as end positions PED.

The fourth modification is different from the second modification in that two overlapping regions TR are arranged along the X axis, and is different from the third modification in that the two overlapping regions TR are separated from each other in the direction along the X axis. Specifically, the first band region BRD_1 includes a non-overlapping region SRD_1, an overlapping region DRD_12, an overlapping region TRD_1, and an overlapping region DRD_41. In the overlapping region TRD_1, the first band region BRD_1, the second band region BRD_2, and the fourth band region BRD_4 overlap and the third band region BRD_3 does not overlap.

The second band region BRD_2 includes a non-overlapping region SRD_2, the overlapping region DRD_12, the overlapping region TRD_1, an overlapping region DRD_24, an overlapping region TRD_2, and an overlapping region DRD_23. In the overlapping region TRD_2, the second band region BRD_2, the third band region BRD_3, and the fourth band region BRD_4 overlap and the first band region BRD_1 does not overlap.

The third band region BRD_3 includes a non-overlapping region SRD_3, the overlapping region DRD_23, the overlapping region TRD_2, and an overlapping region DRD_34. The fourth band region BRD_4 includes a non-overlapping region SRD_4, the overlapping region DRD_34, the overlapping region TRD_1, the overlapping region DRD_24, the overlapping region TRD_2, and the overlapping region DRD_41.

As illustrated in FIG. 12, the overlapping region DRD_24 is provided between the overlapping region TRD_2 and the overlapping region TRD_1. In addition, the position of the overlapping region TRD_2 in the auxiliary scan direction is identical to the position of the overlapping region TRD_1 in the auxiliary scan direction. In other words, the overlapping region TRD_2 and the overlapping region TRD_1 are arranged side by side in the main scan direction.

In the fourth modification, the overlapping region TRD_2 corresponds to the "eighth overlapping region", and the overlapping region TRD_1 corresponds to the "ninth overlapping region". The overlapping region DRD_24 corresponds to a "tenth overlapping region".

Figure 13:
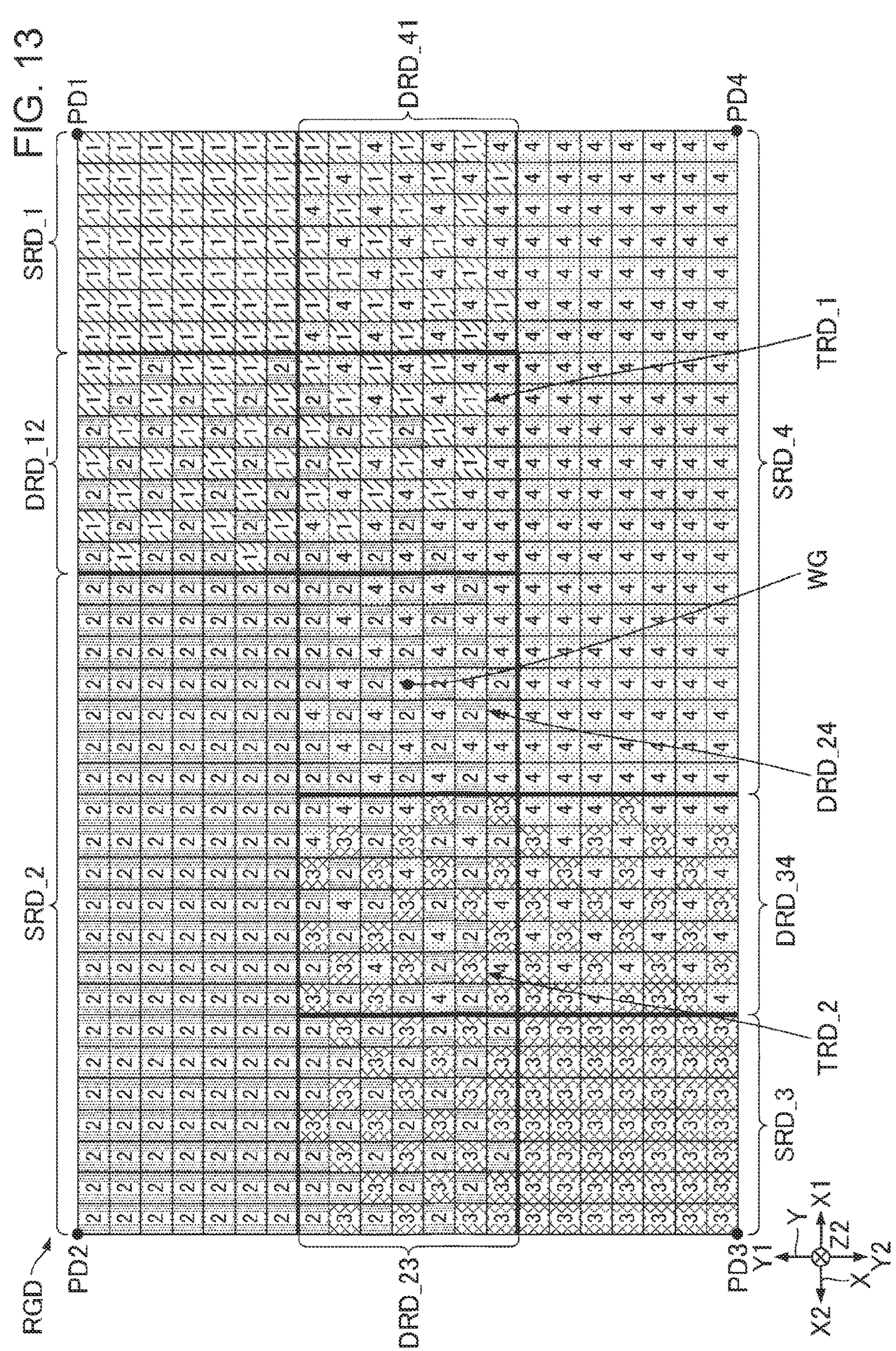
FIG. 13 is a diagram illustrating a state in which a region illustrated in FIG. 12 is enlarged.

FIG. 13 is a diagram illustrating a state in which a region RGD illustrated in FIG. 12 is enlarged. The region RGD is a rectangular region having a vertex PD1, a vertex PD2, a vertex PD3, and a vertex PD4. As is understood from FIG. 13, the vertex PD1 is included in the first band region BRD_1. The vertex PD2 is included in the second band region BRD_2. The vertex PD3 is included in the third band region BRD_3. The vertex PD4 is included in the fourth band region BRD_4.

In the example illustrated in FIG. 13, the computer 7 generates the print data Img in such a way that recording ratios are changed in the overlapping regions DRD and the overlapping regions TRD. In FIG. 13, in the region RGD, each rectangle in each non-overlapping region SRD, each overlapping region TRD, and each overlapping region DRD indicates a single pixel, and a number included in each pixel indicates a printing operation of applying an ink droplet to the pixel. For example, in the overlapping region DRD_12, the recording ratio in the first printing operation becomes higher toward the X1 direction, and the recording ratio in the second printing operation becomes higher toward the X2 direction. In addition, in the overlapping region DRD_41, the recording ratio in the first printing operation becomes higher toward the Y1 direction, and the recording ratio in the fourth printing operation becomes higher toward the Y2 direction. Similarly, in the overlapping region DRD_24, the recording ratio in the second printing operation becomes higher toward the Y1 direction, and the recording ratio in the fourth printing operation becomes higher toward the Y2 direction. In the overlapping region TRD_1, the recording ratios in the first printing operation and the second printing operation become higher toward the Y1 direction, the recording ratio in the fourth printing operation becomes higher toward the Y2 direction, the recording ratio in the first printing operation becomes higher toward the X1 direction, and the recording ratio in the second printing operation becomes higher toward the X2 direction. Although other descriptions are omitted, it is possible to suppress a noticeable change in the quality of an image between each non-overlapping region SRD and each overlapping region DRD by gradually changing the recording ratios in each overlapping region in the above-described manner.

In the fourth modification, the overlapping region DRD_24 is provided between the overlapping region TRD_2 and the overlapping region TRD_1. In the overlapping region DRD_24, the second band region BRD_2 and the fourth band region BRD_4 overlap and the first band region BRD_1 and the third band region BRD_3 do not overlap.

As in the third modification, when the overlapping regions TR in which the three band regions BR overlap are adjacent to each other in the direction along the X axis, the quality of an image may easily decrease due to a positional shift. Therefore, in the fourth modification, it is possible to suppress a reduction in the quality of an image by providing, between the two overlapping regions TR, the overlapping region DR in which the two band regions BR overlap.

In the fourth modification, in the overlapping region DR provided between the two overlapping regions TR, the second band region BRD_2 and the fourth band region BRD_4 overlap and the first band region BRD_1 and the third band region BRD_3 do not overlap. However, the overlapping region DR provided between the two overlapping regions TR may be a region in which the first band region BRD_1 and the third band region BRD_3 overlap and the second band region BRD_2 and the fourth band region BRD_4 do not overlap.

A position of at least a portion of the overlapping region TRD_2 in the auxiliary scan direction is identical to a position of at least a portion of the overlapping region TRD_1 in the auxiliary scan direction.

For example, when the two overlapping regions TRD in which the three band regions BR overlap are arranged side by side in the auxiliary scan direction, it is necessary to change the widths of the band regions BR. When the widths of the band regions BR are changed and reduced, ink is not ejected from one or more of the nozzles N included in the nozzle arrays NL, and as a result, the number of band regions BR may be increased. When the number of band regions BR is increased, takt time for producing a product may increase and the productivity of products may decrease. According to the fourth modification, since the three band regions BRD overlap in each of the two overlapping regions TRD, and the positions of the two overlapping regions TRD in the auxiliary scan direction are identical, it is possible to suppress an increase in the number of band regions BR.

The overlapping region TRD_2 is a region in which the second band region BRD_2, the third band region BRD_3, and the fourth band region BRD_4 overlap and the first band region BRD_1 does not overlap. The overlapping region TRD_1 is a region in which the first band region BRD_1, the second band region BRD_2, and the fourth band region BRD_4 overlap and the third band region BRD_3 does not overlap.

In the fourth modification, the overlapping region TRD_1 and the overlapping region TRD_2 are arranged side by side along the X axis, but are not limited thereto. For example, the two overlapping regions TR in which the three band regions BR overlap may be arranged side by side along the Y axis. However, in this case, a width of each of the band regions BR in the direction along the Y axis needs to be changed or the positions of the routes RT in the direction along the Y axis in each printing operation need to be different. Therefore, as in the fourth modification, it is preferable that the overlapping region TRD_1 and the overlapping region TRD_2 be arranged side by side along the X axis.

2-5. Fifth Modification

Figure 14:
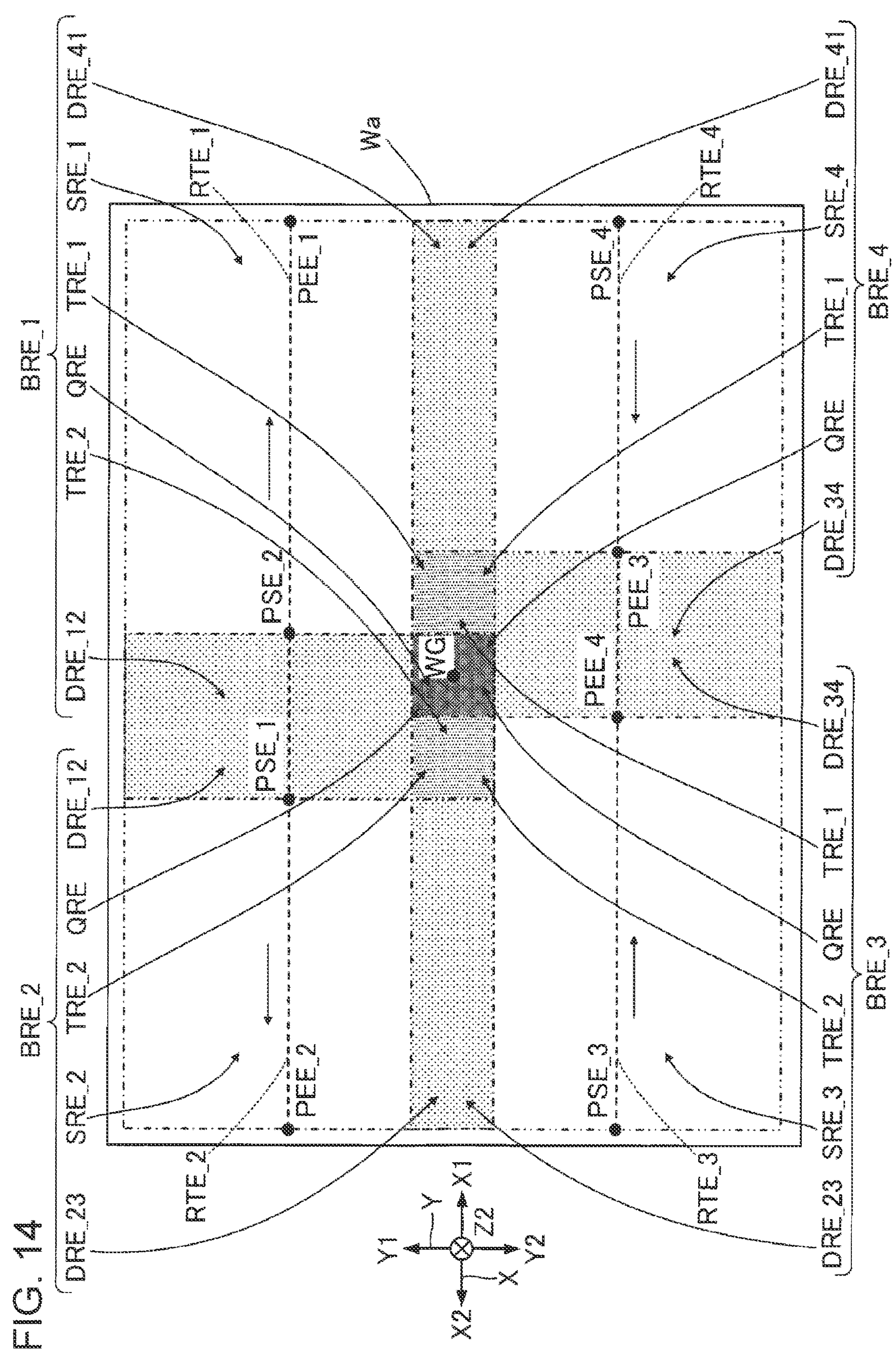
FIG. 14 is a diagram illustrating an example of division of a printing region according to a fifth modification.

FIG. 14 is a diagram illustrating an example of division of a printing region Wa according to a fifth modification. In FIG. 14, the printing region Wa includes a first band region BRE_1, a second band region BRE_2, a third band region BRE_3, and a fourth band region BRE_4. In the following description, the first band region BRE_1, the second band region BRE_2, the third band region BRE_3, and the fourth band region BRE_4 may be collectively referred to as band regions BRE without being distinguished. In addition, routes in the band regions BRE may be collectively referred to as routes RTE. Start positions of the routes RTE may be collectively referred to as start positions PSE. End positions of the routes RTE may be collectively referred to as end positions PEE.

The four band regions BRE are different from the band regions BRD in that each of the four band regions BRE includes an overlapping region QR. Specifically, the first band region BRE_1 includes a non-overlapping region SRE_1, an overlapping region DRE_12, an overlapping region TRE_1, an overlapping region QRE, an overlapping region TRE_2, and an overlapping region DRE_41. In the overlapping region TRE_1, the first band region BRE_1, the third band region BRE_3, and the fourth band region BRE_4 overlap and the second band region BRE_2 does not overlap. In the overlapping region TRE_2, the first band region BRE_1, the second band region BRE_2, and the third band region BRE_3 overlap and the fourth band region BRE_4 does not overlap.

The second band region BRE_2 includes a non-overlapping region SRE_2, the overlapping region DRE_12, the overlapping region TRE_2, the overlapping region QRE, and an overlapping region DRE_23. The third band region BRE_3 includes a non-overlapping region SRE_3, the overlapping region DRE_23, the overlapping region TRE_2, the overlapping region QRE, the overlapping region TRE_1, and an overlapping region DRE_34. The fourth band region BRE_4 includes a non-overlapping region SRE_4, the overlapping region DRE_34, the overlapping region QRE, the overlapping region TRE_1, and the overlapping region DRE_41.

As illustrated in FIG. 14, the overlapping region TRE_2 is provided adjacent to the overlapping region QRE. The overlapping region TRE_2 is provided adjacent to the overlapping region QRE in the main scan direction. In the fifth modification, the overlapping region TRE_2 is an example of a "sixth overlapping region" and the overlapping region QRE is an example of the "third overlapping region".

According to the third modification, in the printing region Wa, the overlapping region TRE_2 is provided adjacent to the overlapping region QRE and is a region in which the three of the first band region BRE_1, the second band region BRE_2, the third band region BRE_3, and the fourth band region BRE_4 overlap and the other one of the first band region BRE_1, the second band region BRE_2, the third band region BRE_3, and the fourth band region BRE_4 does not overlap.

As described above, when the position of any one of the four band regions BR in the overlapping region QR shifts, the quality of an image in the overlapping region QR decrease. Therefore, as in the first embodiment, when the overlapping region QR in which the quality of an image may easily decrease due to a positional shift is adjacent to the overlapping regions DR in which the quality of an image hardly decreases, as compared with the overlapping region QR, a reduction in the quality of an image in the overlapping region QR may be noticeable. In the fifth modification, it is possible to suppress a noticeable reduction in the quality of an image in the overlapping region QRE by providing, between the overlapping region QRE and the overlapping regions DRE, the overlapping regions TRE in which the quality of an image is between the quality of an image in the overlapping region QRE and the quality of an image in each of the overlapping regions DRE.

In addition, the overlapping region QRE is provided adjacent to the overlapping region TRE_2 in the main scan direction.

The overlapping region TRE_2 is a region in which the first band region BRE_1, the second band region BRE_2, and the third band region BRE_3 overlap and the fourth band region BRE_4 does not overlap.

In the fifth modification, the overlapping region TRE_1, the overlapping region QRE, and the overlapping region TRE_2 are arranged side by side along the X axis, but are not limited thereto. For example, the two overlapping regions TR in which the three band regions BR overlap, and the overlapping region QR in which the four band regions BR overlap may be arranged side by side along the Y axis. Alternatively, the overlapping region TRE_1, the overlapping region QRE, and the overlapping region TRE_2 may be arranged side by side along the X axis, and the overlapping region QRE and the two the overlapping regions TR in which the three band regions BR overlap may be arranged side by side along the Y axis.

2-6. Sixth Modification

Figure 15:
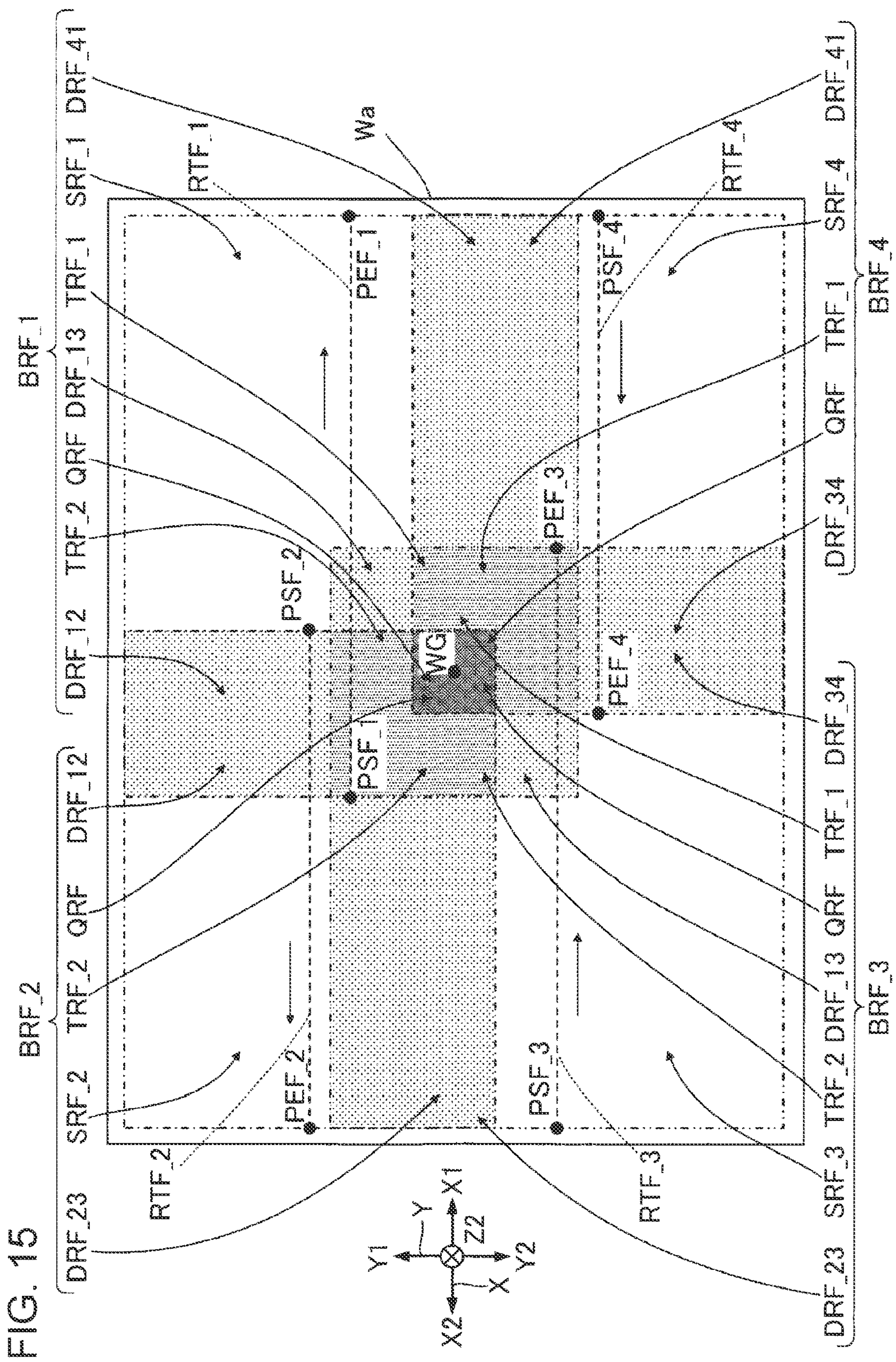
FIG. 15 is a diagram illustrating an example of division of a printing region according to a sixth modification.

FIG. 15 is a diagram illustrating an example of division of a printing region Wa according to a sixth modification. In FIG. 15, the printing region Wa includes a first band region BRF_1, a second band region BRF_2, a third band region BRF_3, and a fourth band region BRF_4. In the following description, the first band region BRF_1, the second band region BRF_2, the third band region BRF_3, and the fourth band region BRF_4 may be collectively referred to as band regions BRF without being distinguished. In addition, routes in the band regions BRF may be collectively referred to as routes RTF. Start positions of the routes RTF may be collectively referred to as start positions PSF. End positions of the routes RTF may be collectively referred to as end positions PEF.

The four band regions BRF are different from the band regions BRE in that portions of overlapping regions TR are present in the auxiliary scan direction with respect to an overlapping region QR. Specifically, the first band region BRF_1 includes a non-overlapping region SRF_1, an overlapping region DRF_12, an overlapping region TRF_1, an overlapping region QRF, an overlapping region DRF_13, an overlapping region TRF_2, and an overlapping region DRF_41. In the overlapping region TRF_1, the first band region BRF_1, the third band region BRF_3, and the fourth band region BRF_4 overlap and the second band region BRF_2 does not overlap. In the overlapping region TRF_2, the first band region BRF_1, the second band region BRF_2, and the third band region BRF_3 overlap and the fourth band region BRF_4 does not overlap. The overlapping region TRF_1 is a rectangle having a notch in the Y1 direction and the X2 direction. The overlapping region TRF_2 is a rectangle having a notch in the X1 direction and the Y2 direction.

The second band region BRF_2 includes a non-overlapping region SRF_2, the overlapping region DRF_12, the overlapping region TRF_2, the overlapping region QRF, and an overlapping region DRF_23. The third band region BRF_3 includes a non-overlapping region SRF_3, the overlapping region DRF_23, the overlapping region TRF_2, the overlapping region QRF, the overlapping region DRF_13, the overlapping region TRF_1, and an overlapping region DRF_34. The fourth band region BRF_4 includes a non-overlapping region SRE_4, the overlapping region DRE_34, the overlapping region QRE, the overlapping region TRF_1, and the overlapping region DRF_41.

In the sixth modification, it is possible to suppress a noticeable reduction in the quality of an image in the overlapping region QRE by providing the overlapping regions TRF between the overlapping region QRF and the overlapping regions DRF in the direction along the Y axis, similarly to the fifth modification. In the overlapping regions TRF, the quality of an image is between the quality of an image in the overlapping region QRF and the quality of an image in each of the overlapping region DRF.

2-7. Seventh Modification

Figure 16:
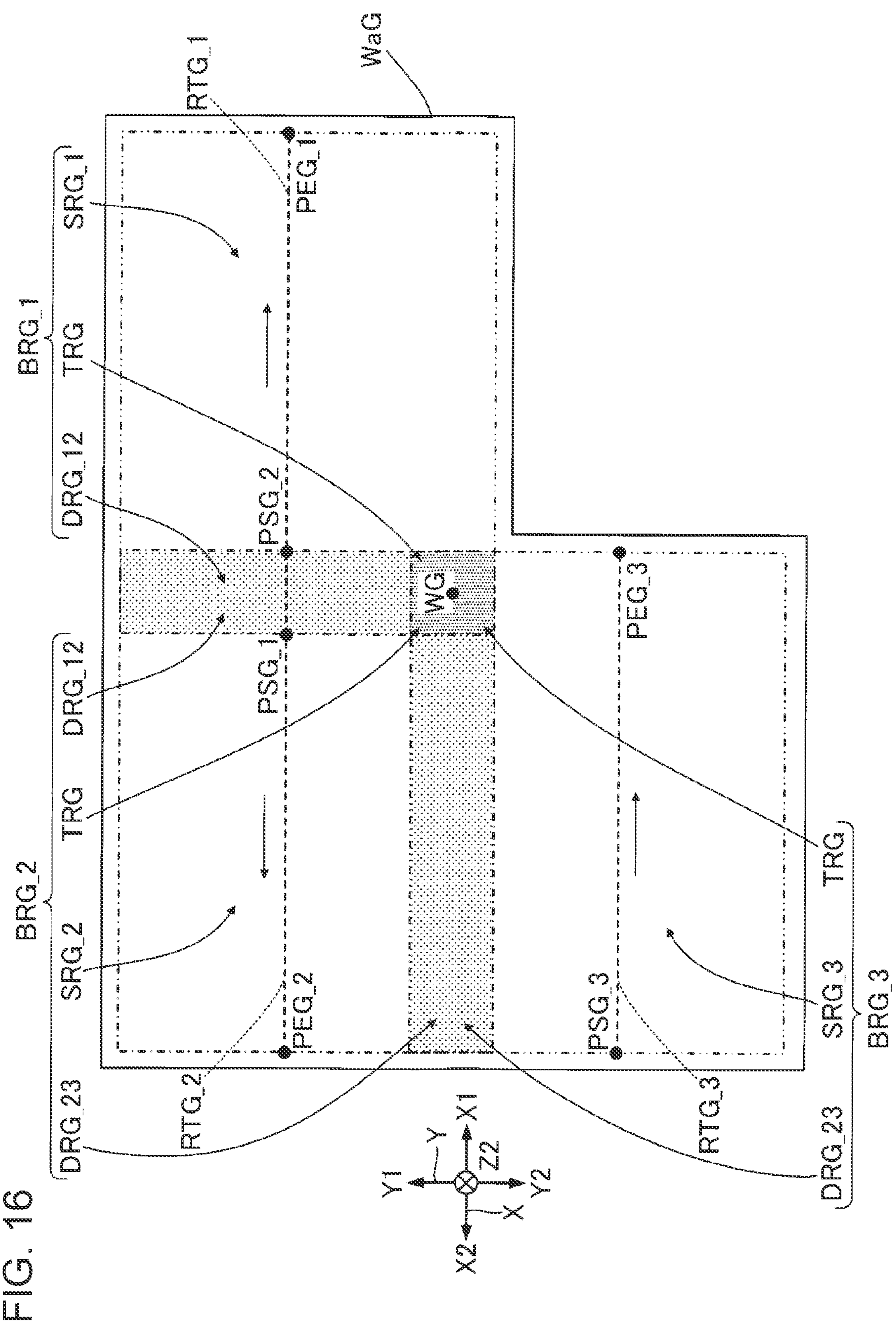
FIG. 16 is a diagram illustrating an example of division of a printing region according to a seventh modification.

FIG. 16 is a diagram illustrating an example of division of a printing region WaG according to a seventh modification. The printing region WaG is a rectangle having a notch in the X1 direction and the Y2 direction. In FIG. 16, the printing region WaG includes a first band region BRG_1, a second band region BRG_2, and a third band region BRG_3. In the following description, the first band region BRG_1, the second band region BRG_2, and the third band region BRG_3 may be collectively referred to as band regions BRG without being distinguished. In addition, routes in the band regions BRG may be collectively referred to as routes RTG. Start positions of the routes RTG may be collectively referred to as start positions PSG. End positions of the routes RTG may be collectively referred to as end positions PEG. The seventh modification is different from the first embodiment and the other modifications in that a fourth band region is not provided.

The first band region BRG_1 includes a non-overlapping region SRG_1, an overlapping region DRG_12, and an overlapping region TRG. The second band region BRG_2 includes a non-overlapping region SRG_2, the overlapping region DRG_12, the overlapping region TRG, and an overlapping region DRG_23. The third band region BRG_3 includes a non-overlapping region SRG_3, the overlapping region DRG_23, and the overlapping region TRG.

In the seventh modification, the overlapping region TRG is an example of the "third overlapping region".

In the seventh modification, the printing region WaG includes the overlapping region TRG in which all of the first band region BRG_1, the second band region BRG_2, and the third band region BRG_3 overlap.

It is possible to suppress the occurrence of a white streak and a black streak by providing the overlapping region TRG. In the seventh modification, the third band region BRG_3 can be omitted depending on the shape of the printing region.

2-8. Eighth Modification

The printing apparatus 1 according to each of the aspects described above includes the robot 2 having the joints 230 that rotate, but may have a robot having a joint that linearly moves.

Figure 17:
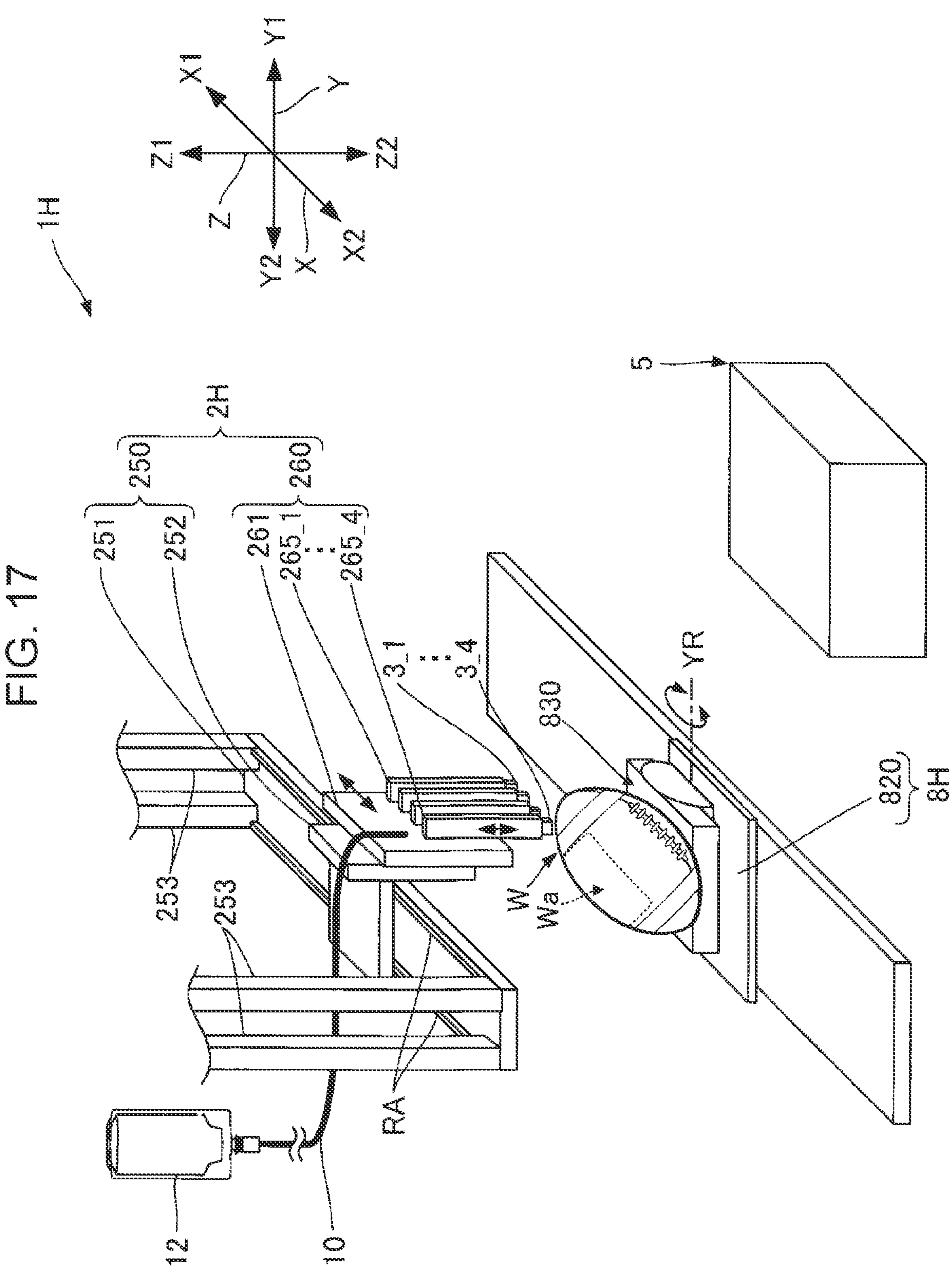
FIG. 17 is a perspective view illustrating a schematic structure of a printing apparatus according to an eighth modification.

FIG. 17 is a perspective view illustrating a schematic structure of a printing apparatus 1H according to an eighth modification. The printing apparatus 1H is different from the printing apparatus 1 in that the printing apparatus 1H includes a robot 2H instead of the robot 2 and a work moving mechanism 8H instead of the work moving mechanism 8. The robot 2H includes a linear motion mechanism 250 and an elevating mechanism 260.

The linear motion mechanism 250 changes relative positions of four head units 3 with respect to a work W along the X axis. The linear motion mechanism 250 includes a rail member 251 and a carriage 252. The rail member 251 is a flat member on which the carriage 252 moves along the X axis. Two rails RA along the X axis are provided on a surface of the rail member 251 facing toward the Z1 direction. The two rails RA extend along the X axis. The rail member 251 is fixed by a support member 253 attached to a ceiling. The carriage 252 is slidably engaged with the rails RA. Although not illustrated, a drive mechanism that moves the carriage 252 is disposed in the linear motion mechanism 250. The drive mechanism includes, for example, a motor that generates drive force for moving the carriage 252, a decelerator that reduces the drive force and outputs the reduced drive force, and a horizontal encoder that detects a movement amount by which the carriage 252 moved.

The elevating mechanism 260 moves the four head units 3 along the Z axis. The elevating mechanism 260 includes a support plate 261 and four individual elevating mechanisms 265. The four individual elevating mechanisms 265 are also referred to as individual elevating mechanisms 265_1 to 265_4.

The support plate 261 supports the individual elevating mechanisms 265 and is fixed to the carriage 252. As the carriage 252 moves along the X axis, the support 261 attached to the carriage 252 also moves along the X axis. Each of the individual elevating mechanisms 265 moves a respective one of the four head units 3 along the Z axis. The individual elevating mechanisms 265 are fixed to the support plate 261. The head units 3 are attached as end effectors in the Z2 direction with respect to the four individual elevating mechanisms 265 in a state of being fixed by screws or the like.

The work moving mechanism 8H includes a rotational axis mechanism 820.

The rotational axis mechanism 820 is rotatable around a rotational axis YR along the Y axis. The rotational mechanism 820 has a mounting surface 830. The work W is mounted on the mounting surface 830. When the rotational axis mechanism 820 rotates, the orientation of the mounting surface 830 changes. When the orientation of the mounting surface 830 changes, the orientation of the work W mounted on the mounting surface 830 changes. The printing apparatus 1H according to the eighth modification performs a printing operation in the head 3*a* ejects ink onto the work W while the carriage 252 and the individual elevating mechanisms 265 are operated. In addition, the rotational axis mechanism 820 rotates around the rotational axis YR to perform an operation corresponding to a main scan movement operation in a time period between a plurality of printing operations. Furthermore, although not illustrated in FIG. 17, the work moving mechanism 8H may perform an operation corresponding to an auxiliary scan movement operation by moving the rotational axis mechanism 820 along the Y axis by using a rail mechanism or the like. It is preferable to combine the printing apparatus 1H with the techniques disclosed in the first embodiment and each of the modifications.

In the eighth modification, a width D1X that is a length of the overlapping region DR_12 in the main scan direction may be shorter than a width D2Y that is a length of the overlapping region DR_23 in the auxiliary scan direction.

As in the eighth modification, in an aspect in which a head 3*a* is moved in an XZ direction by the robot 2H and the work W is held by the work moving mechanism 8H, when a curvature radius of the work W is relatively small, and an attempt is made to suppress a reduction in the quality of an image, a length of each of the band regions BR in the main scan direction tends to decrease. Therefore, it is possible to suppress a reduction in the quality of an image by setting the width D1X to be shorter than the width D2Y.

2-9. Ninth Modification

In each of the printing operations in each of the aspects described above, the head 3*a* is moved from the start position PS to the end position PE once for each of the band regions BR. However, the head 3*a* is not limited thereto. For example, for each of the band regions BR, the head 3*a* may be moved along the route RT a plurality of times and eject ink in each of the plurality of movements. For each of the plurality of movements, the computer 7 generates print data Img indicating a partial image corresponding to each of the plurality of movements. For example, when the head 3*a* is moved a number n of times in each of the band regions BR, the computer 7 generates print data Img in such a way that a recording ratio is 1/n for each of the movements.

2-10. Tenth Modification

In each of the aspects described above, the printing region Wa is wider than the range AR in which the head 3*a* can be moved by the robot 2, but is not limited thereto. For example, the printing region Wa may be included in the range AR. For example, as the head 3*a* becomes farther from the base portion 210, a vibration that occurs in the head 3*a* may become larger. When the vibration that occurs in the head 3*a* becomes larger, the actual route of the head 3*a* may be different from an ideal route of the head 3*a*, and the head 3*a* may cause a reduction in the quality of an image. To avoid this, even when the printing region Wa is included in the range AR, the printing apparatus 1 can suppress a reduction in the quality of an image by moving the work W in a time period between a plurality of printing operations.

2-11. Eleventh Modification

In each of the aspects described above, the configuration in which the screw or the like is used to fix the head 3*a* to the robot 2 is exemplified. However, the robot 2 and the head 3*a* are not limited to this configuration. For example, the head 3*a* may be fixed to the robot 2 by gripping the head 3*a* by a gripping mechanism such as a hand attached as an end effector of the robot 2.

What is claimed is:

1. A printing apparatus comprising:

a head that ejects a liquid;

a robot that includes a base portion and a distal end portion supporting the head and changes a relative position of the head with respect to the base portion;

a moving mechanism that moves a work relative to the base portion; and a controller that performs a plurality of printing operations in which the robot moves the head in a main scan direction and the head ejects the liquid onto a printing region on the work, wherein the plurality of printing operations include a first printing operation in which the head ejects the liquid onto a first region in the printing region, and a second printing operation in which the head ejects the liquid onto a second region in the printing region, the controller performs a main scan movement operation in which the moving mechanism moves the work relative to the base portion in the main scan direction in a time period between the first printing operation and the second printing operation, the first region is adjacent to the second region in the main scan direction, and the printing region includes a first overlapping region in which the first region overlaps the second region.

2. The printing apparatus according to claim 1, wherein the plurality of printing operations include a third printing operation in which the head ejects the liquid onto a third region in the printing region, and the second region is adjacent to the third region in an auxiliary scan direction intersecting the main scan direction.

3. The printing apparatus according to claim 2, wherein the moving mechanism maintains a relative position of the base portion with respect to the work in a time period between the second printing operation and the third printing operation.

4. The printing apparatus according to claim 2, wherein the printing region includes a second overlapping region in which the second region overlaps the third region.

5. The printing apparatus according to claim 4, wherein the printing region includes a third overlapping region in which the first region, the second region, and the third region overlap.

6. The printing apparatus according to claim 4, wherein a length of the first overlapping region in the main scan direction is longer than a length of the second overlapping region in the auxiliary scan direction.

7. The printing apparatus according to claim 4, wherein a length of the first overlapping region in the main scan direction is shorter than a length of the second overlapping region in the auxiliary scan direction.

8. The printing apparatus according to claim 2, wherein the main scan movement operation and the first printing operation are performed before or after the second printing operation and the third printing operation.

9. The printing apparatus according to claim 4, wherein the plurality of printing operations include a fourth printing operation in which the head ejects the liquid onto a fourth region in the printing region, the third region is adjacent to the fourth region in the main scan direction, the printing region includes a fourth overlapping region in which the third region overlaps the fourth region, the first region is adjacent to the fourth region in the auxiliary scan direction, and the printing region includes a fifth overlapping region in which the first region overlaps the fourth region.

10. The printing apparatus according to claim 9, wherein the printing region includes a third overlapping region in which the first region, the second region, and the third region overlap, and in the third overlapping region, the first region, the second region, the third region, and the fourth region overlap.

11. The printing apparatus according to claim 9, wherein the main scan movement operation is performed before the first printing operation and the fourth printing operation and after the second printing operation and the third printing operation or is performed after the first printing operation and the fourth printing operation and before the second printing operation and the third printing operation.

12. A printing method of a printing apparatus including a head that ejects a liquid, a robot that includes a base portion and a distal end portion supporting the head and changes a relative position of the head with respect to the base portion, and a moving mechanism that moves a work relative to the base portion, the printing method comprising:

a plurality of printing operations in which the robot moves the head in a main scan direction and the head ejects the liquid onto a printing region on the work, the plurality of printing operation including a first printing operation in which the head ejects the liquid onto a first region in the printing region and a second printing operation in which the head ejects the liquid onto a second region in the printing region; and a main scan movement operation in which the moving mechanism moves the work relative to the base portion in the main scan direction in a time period between the first printing operation and the second printing operation, wherein the first region is adjacent to the second region in the main scan direction, and the printing region includes a first overlapping region in which the first region overlaps the second region on the work.

* * * * *